(12) United States Patent
Fuechsel et al.

(10) Patent No.: US 9,962,875 B2
(45) Date of Patent: May 8, 2018

(54) METHOD FOR PRODUCING A STEERING GEAR HOUSING

(71) Applicant: Robert Bosch Automotive Steering GmbH, Schwaebisch Gmuend (DE)

(72) Inventors: Dennis Fuechsel, Schwaebisch Gmuend (DE); Jens Hafermalz, Waeschenbeuren (DE)

(73) Assignee: Robert Bosch Automotive Steering GmbH (DE)

( * ) Notice: Subject to any disclaimer, the term of this patent is extended or adjusted under 35 U.S.C. 154(b) by 280 days.

(21) Appl. No.: 14/437,264

(22) PCT Filed: Oct. 25, 2013

(86) PCT No.: PCT/EP2013/072363
§ 371 (c)(1),
(2) Date: Apr. 21, 2015

(87) PCT Pub. No.: WO2014/067863
PCT Pub. Date: May 8, 2014

(65) Prior Publication Data
US 2015/0273748 A1 Oct. 1, 2015

(30) Foreign Application Priority Data

Oct. 30, 2012 (DE) .......................... 10 2012 110 373

(51) Int. Cl.
*B29C 45/14* (2006.01)
*B29C 45/27* (2006.01)
(Continued)

(52) U.S. Cl.
CPC .......... *B29C 45/2708* (2013.01); *B29C 45/14* (2013.01); *B29C 45/14467* (2013.01); *B29C 45/16* (2013.01); *B62D 5/04* (2013.01); *F16J 13/08* (2013.01); *F16J 15/064* (2013.01); *F16J 15/14* (2013.01); *B29C 2045/1454* (2013.01); *B29K 2083/005* (2013.01); *B29L 2031/30* (2013.01)

(58) Field of Classification Search
None
See application file for complete search history.

(56) References Cited

U.S. PATENT DOCUMENTS 4,423,540 A * 1/1984 Hishida ............. B29C 45/14467
249/142
6,228,290 B1 * 5/2001 Reames ............ B29C 45/14434
156/107

FOREIGN PATENT DOCUMENTS

DE        25 01 291          7/1976
DE   10 2009 026 984         4/2011
(Continued)

OTHER PUBLICATIONS

Menges, G.: Mohren, P.: Anleitung zum Bau von Spritzgiesswekzeugen, 4. Aufl. Muenchen: Carl Hanser Verlag, 1998, Seite S. 204,—ISBN: 3-446-19437-1.

*Primary Examiner* — Edmund Lee
(74) *Attorney, Agent, or Firm* — Jordan and Koda, PLLC

(57) ABSTRACT

A method and a system for producing a plastic housing are presented. In a first step, a base body and at least one closure element are produced, and in a second step an elastomer layer is applied by way of at least one gate point using a gating process, the layer joining the base body and the at least one closure element to each other.

13 Claims, 27 Drawing Sheets

(51) Int. Cl.
*B62D 5/04* (2006.01)
*F16J 13/08* (2006.01)
*F16J 15/06* (2006.01)
*F16J 15/14* (2006.01)
*B29C 45/16* (2006.01)
*B29K 83/00* (2006.01)
*B29L 31/30* (2006.01)

(56) References Cited

FOREIGN PATENT DOCUMENTS

DE    10 2011 084 498     4/2013
WO    WO-2012/026430     3/2012

* cited by examiner

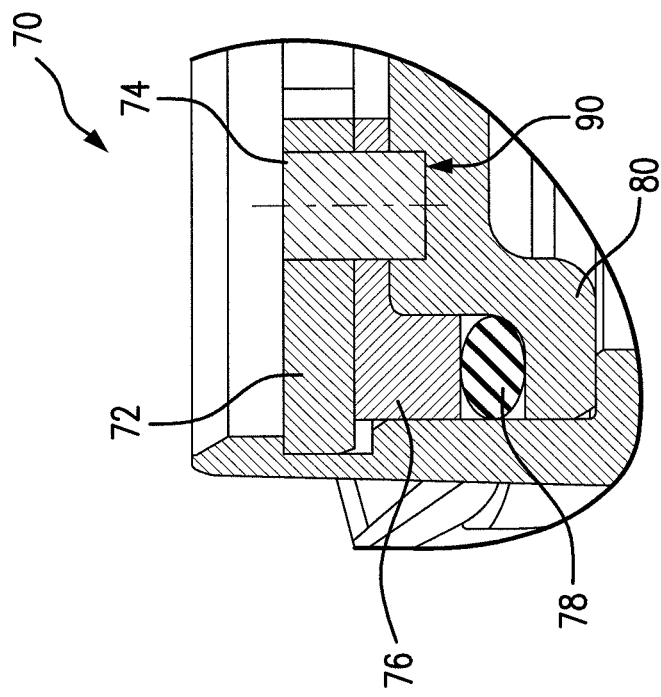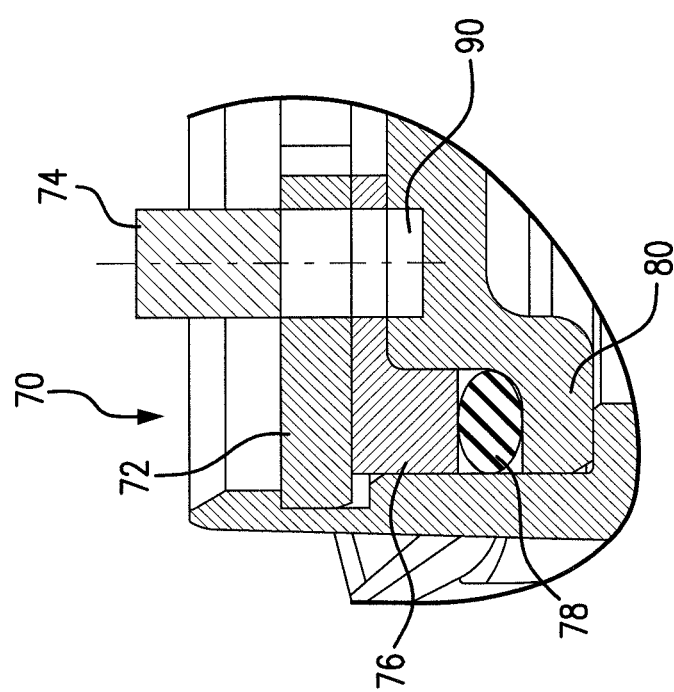
FIG. 7

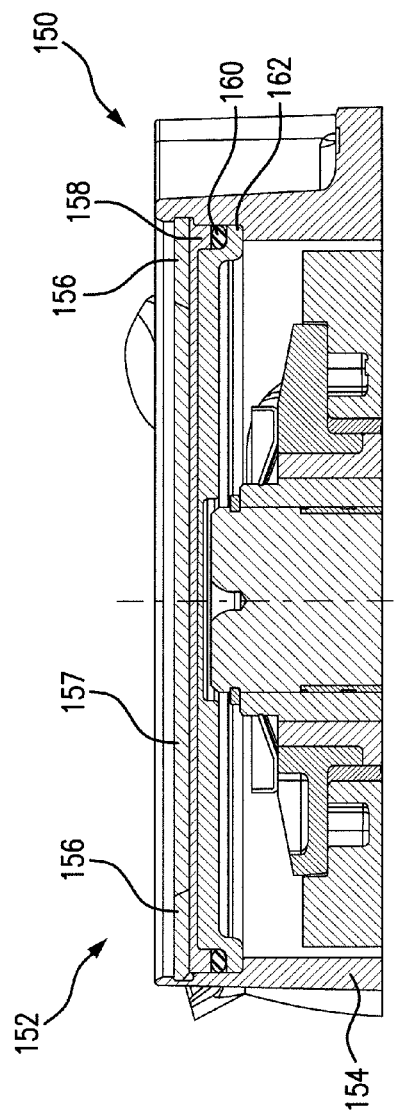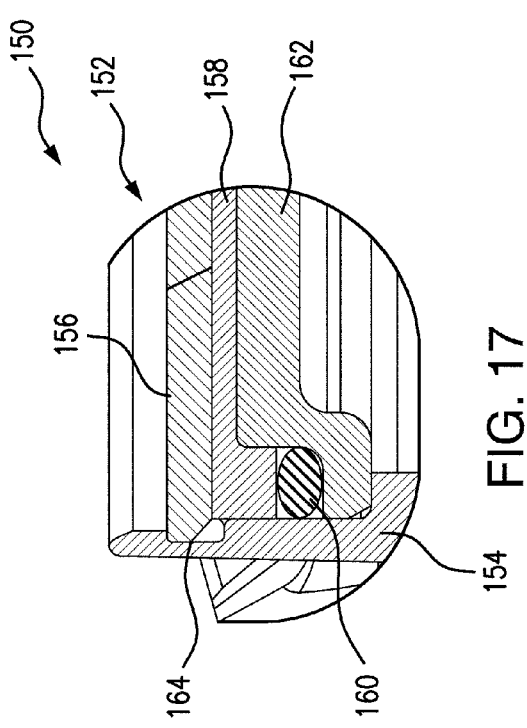

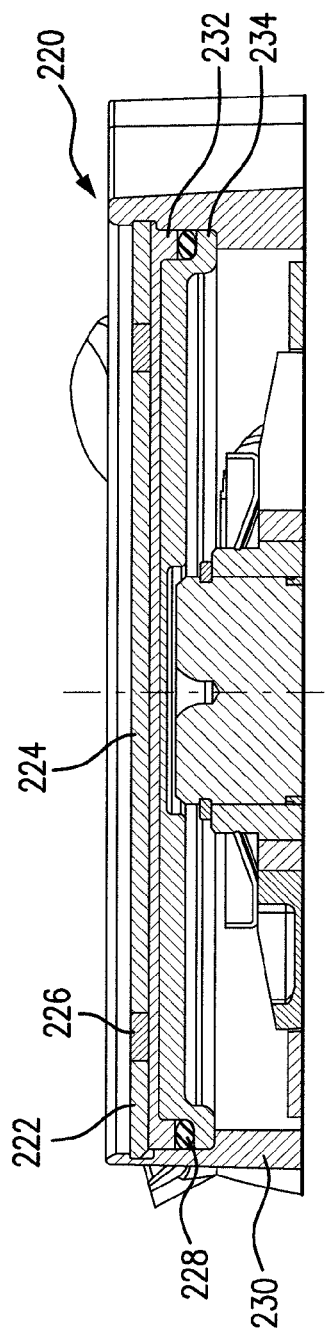
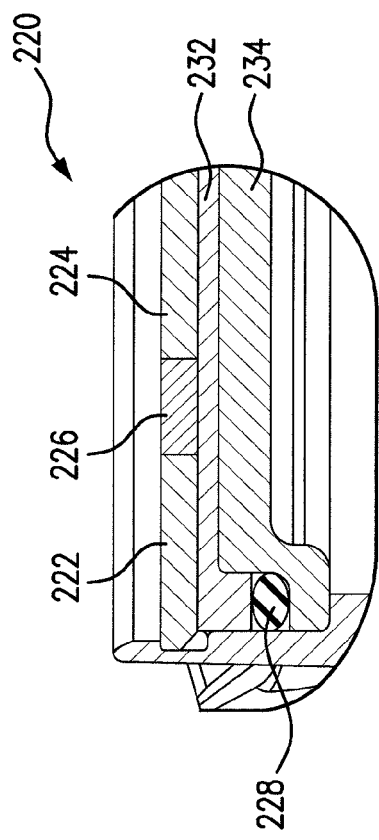
FIG. 24
FIG. 25

METHOD FOR PRODUCING A STEERING GEAR HOUSING

BACKGROUND OF THE INVENTION

The invention relates to a method for producing a plastic housing for a housing for a steering gear and to a system for carrying out the method.

A steering system refers to a device that is used in motor vehicles, for example, to influence the driving direction. A steering movement initiated by the driver on a steering wheel is transmitted, among other things, via a steering gear to coupled wheels. These steering gears are typically surrounded by a housing.

Aluminum die cast housings are used as the steering housing in most housings for steering gears, which are supplemented with plastic housings. The connection between the aluminum housings and the plastic housings is often achieved by bolts. The boreholes in the plastic housing are typically reinforced by metal sleeves to prevent the plastic material from creeping, with consequent loosening of the bolts. An O-ring, which is a technologically mature seal, is often used to seal the plastic housing with respect to the aluminum housing. O-rings are annular sealing elements having round or O-shaped cross-sections.

To ensure that the O-ring seal functions reliably in the customary vehicle temperature range of 40° C. to +120° C., the plastic material used must exhibit thermal expansion similar to that of the aluminum. Moreover, the plastic material must satisfy the strength requirements of the steering system in the vehicle. For this reason, in many embodiments, the plastic materials are reinforced with fillers.

In general applications, plastic materials are often joined to other components by way of snap-fit elements. To this end, a plastic tab is stretched and then engages in an undercut of the other component. The good elasticity of the plastic material is utilized for this purpose. If snap-fit elements are to be used for the connection in a steering gear, the plastic tabs must be very long since the flexibility of reinforced plastic materials is drastically reduced. However, typically no installation space is provided in the vehicle for these long plastic tabs.

Moreover, it must be noted that the fixation of the plastic parts, such as of the plastic housings on the steering housing, should be secure and cost-effective. This can likewise be achieved by snap-fit elements. These snap-fit elements must be displaceable relative to the base body of the plastic housing and radially move into a groove of the steering housing, so as to be able to ensure secure fixation of the plastic housing.

SUMMARY OF THE INVENTION

The presented method is used to produce a plastic housing for a housing of a steering gear, in which, in a first step, a base body and at least one closure element are produced and, in a second step, an elastomer layer is applied by way of at least one gate point in a gating process, the layer joining the base body and the at least one closure element to each other.

Elastomers are dimensionally stable, yet elastically deformable plastic materials.

In one embodiment of the method, exactly one gate point is used in the second step. The material used for the elastomer layer is a thermoplastic elastomer or a silicone material, for example.

In the first step, an injection molding process can be carried out.

In the second step, a diaphragm gate or sprue gate can be carried out.

The plastic housing produced in the above-described manner can be connected to a steering housing to form the housing of a steering gear.

Moreover a system for producing a plastic housing for a housing of a steering gear, and more particularly for carrying out a method of the above-described type, is presented, comprising an upper mold half and a lower mold half and a runner for applying a layer made of an elastic material.

This system can be designed for a sprue gate or a diaphragm gate.

In addition, a housing for a steering gear is presented, comprising a steering housing and a plastic housing, wherein the plastic housing comprises a base body made of a plastic material, an elastomer layer and at least one closure element.

In one embodiment, the elastomer layer is produced from a thermoplastic elastomer or a silicone material.

At least one of the closure elements can be designed as a snap-fit element. As an alternative or in addition, at least one of the closure elements on the housing can be designed as a latching element.

The at least one closure element can have a securing device, with a positive-fit and/or non-positive fit. Moreover, a device for removal can be provided.

The elastomer layer can moreover be provided over the entire circumference of the base body.

Moreover, at least one of the closure elements can be designed as a rotary latching element.

In one embodiment, the plastic housing additionally comprises an O-ring.

Additionally, a plastic housing for a housing for a steering gear is presented, and more particularly for a housing of the type described above, comprising a base body, at least one closure element and an elastomer layer.

The base body and the closure element can be made of a fiber-reinforced plastic material. The layer made of elastic material can be produced from an elastomer. The presented housing ensures a sealed, tight connection, with little installation space, between a plastic housing and a housing, which is preferably made of metal, and more specifically made of aluminum die casting. This can be done by way of a snap-fit function, optionally including securing of the snap-fit elements, a rotary latching function and/or a locking bar function.

The necessary ability to move is achieved by an elastic layer or component, produced from a silicone material or a thermoplastic elastomer, for example, between the base body and the snap-fit or locking bar elements. It is further advantageous when this elastic layer can be used for sealing between the two housings.

Further advantages and embodiments of the invention will be apparent from the description and the accompanying drawings.

The above characteristics and those explained below can, of course, be used not only in the described combination, but also in other combinations or alone, without departing from the scope of the present invention.

The invention is schematically illustrated in the drawings based on an exemplary embodiment and will be described in detail hereafter with reference to the drawings.

BRIEF DESCRIPTION OF THE DRAWINGS

FIG. 7 shows a detail of the plastic housing from FIG. 6 in two views;
FIG. 16 shows one embodiment of the housing;
FIG. 17 shows a detail of FIG. 16;
FIG. 24 shows the plastic housing;
FIG. 25 shows the plastic housing.

DESCRIPTION OF THE PREFERRED EMBODIMENTS

Figure 1:
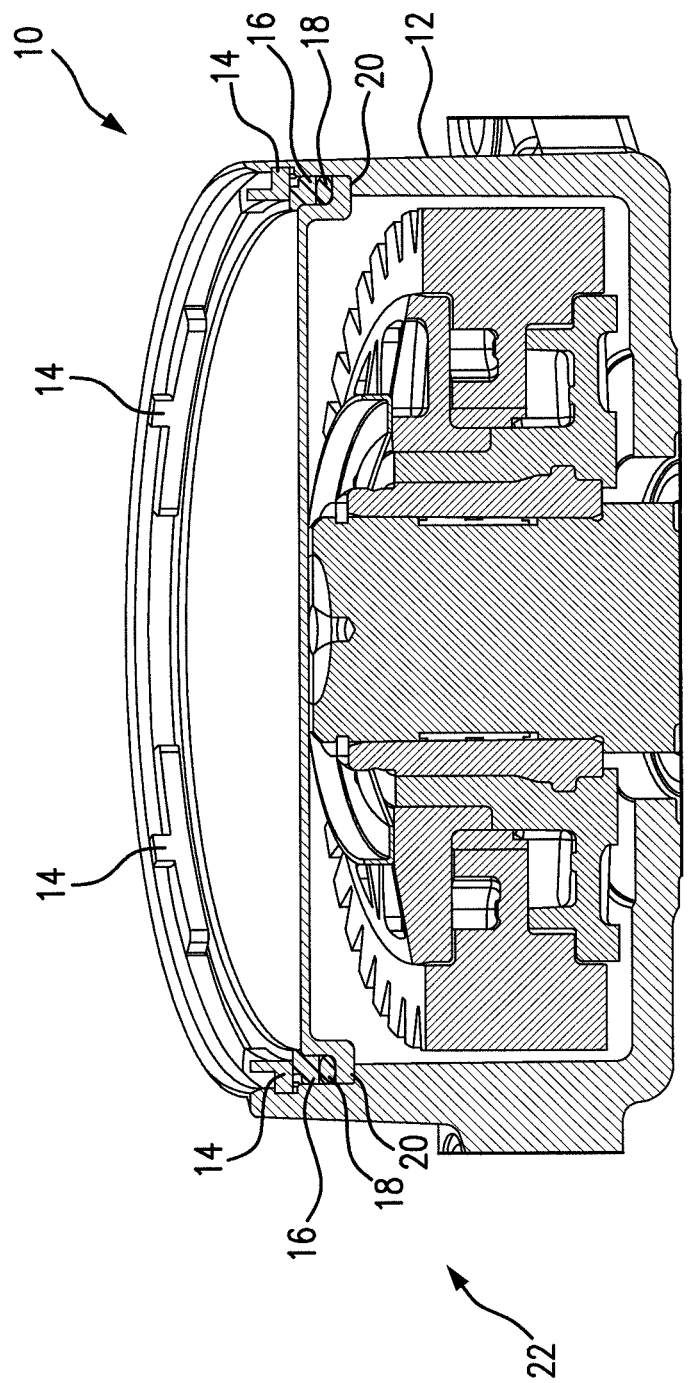
FIG. 1 shows one embodiment of the described housing for a steering gear.

FIG. 1 shows one embodiment of the described housing 10 for a steering gear. The illustration shows a steering housing 12, made of a metallic material, for example, snap-fit element 14, an elastomer layer 16, an O-ring 18, and a base body 20 made of a plastic material. The snap-fit elements 14, the layer 16, the O-ring 18, and the base body 20 form a plastic housing 22.

This plastic housing 22 is thus made of the regularly reinforced base body 20, which is produced from a fiber-reinforced plastic material, for example, and has the strength requirements and similar thermal expansion as the steering housing. A sealing element, the O-ring 18 and/or the elastomer layer 16 are radially supported on this base body 20. An elastic plastic material, such as a silicone material or a thermoplastic elastomer, which forms the elastomer layer 16, is applied to this base body 20 by way of bonding and/or positive fit using an injection molding process.

This elastomer layer 16 and/or the O-ring 18 are radially supported on the base body 20 and can thereby create a sealing action via compression with respect to the steering housing 12. Multiple snap-fit elements 14, which can engage in a groove of the steering housing, are present on the elastomer layer 16. The connection between the elastomer layer 16 and the snap-fit element 14 is achieved, for example, by way of bonding and/or positive fit.

In the snap-fit function, the layer 16 can achieve the necessary deformation of the snap-fit elements 14 with respect to the base body 20 in a small installation space, without exceeding the permissible expansion. So as to fix the plastic housing 22 without play in the steering housing 12, the dimensioning of the components can be selected so that the snap-fit elements 14, when installed, are axially pre-stressed when they are engaged in a steering housing groove. This is achieved by axially compressing the elastomer layer 16.

A groove or a recess is present for this purpose in the elastomer layer 16 and, when installed, is able to accommodate the elastomer which is displaced by the compression. The snap-fit elements 14 can have elevations or recesses on the surface. These form-locked contours allow the snap-fit elements 14 to be pulled out of the groove and out of the steering housing 12 using a tool. When the snap-fit elements 14 have been pulled out of the groove, the plastic housing 22 can be removed. This removal of the snapped-on plastic housing 22 is advantageous when a repair or complete disassembly of the entire steering system must be carried out.

Figure 2:
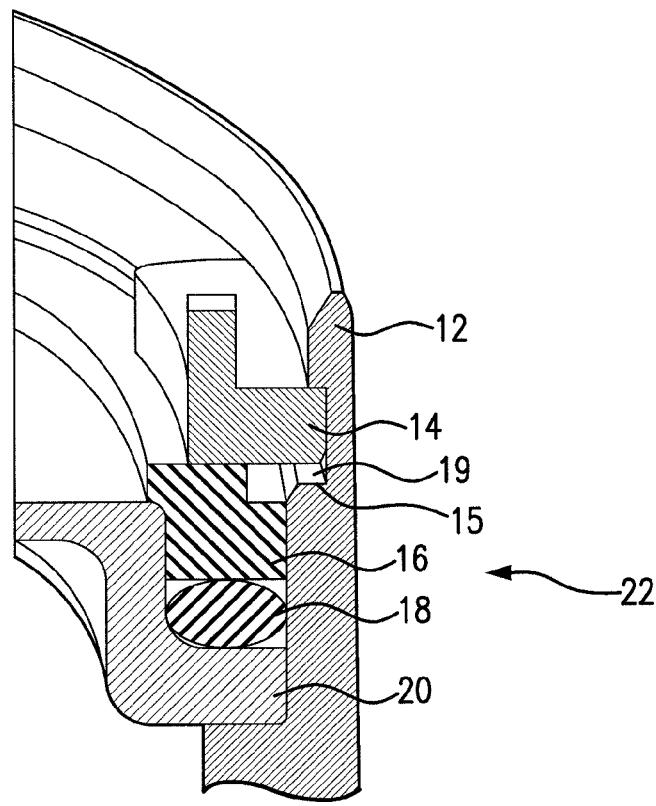
FIG. 2 shows a detail of FIG. 1.

FIG. 2 shows a detail of FIG. 1. The illustration shows the steering housing 12, the snap-fit element 14, the elastomer layer 16, the O-ring 18 and the base body 20. It can be seen that an axial stop 15 is provided in the steering housing 12 for the plastic housing 22, which represents a plastic assembly. The elastomer layer 16 is axially deformed when the snap-fit element 14 engages in the housing groove. A steering housing groove 19 is provided for this purpose.

Figure 3:
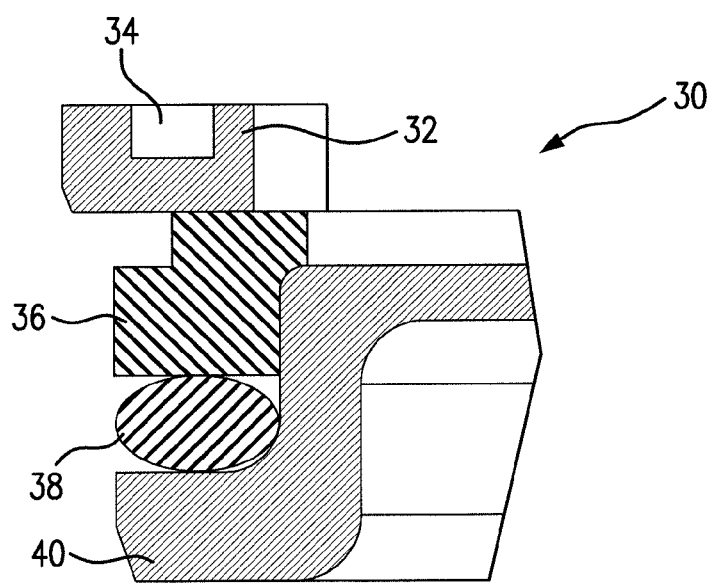
FIG. 3 shows a further detail of a plastic housing.

FIG. 3 shows a detail of a further embodiment of the plastic housing 30 comprising a snap-fit element 32 having a recess 34, an elastomer layer 36, an O-ring 38, and a base body 40. The recess 34 is used for removal, as described above.

Figure 4:
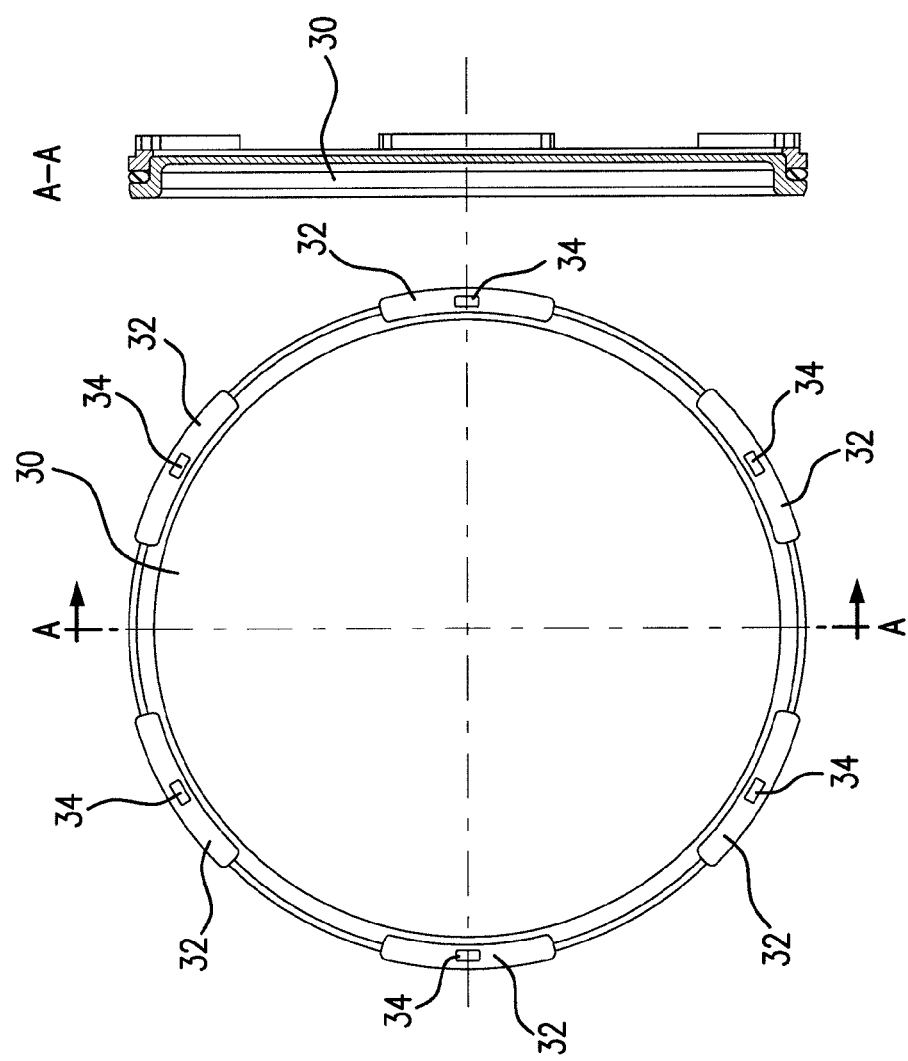
FIG. 4 shows plan and sectional views of the plastic housing from FIG. 3.

FIG. 4 shows a plan view and a sectional view of the plastic housing from FIG. 3. The snap-fit elements 32 having the recesses 34 used for removal can be seen.

Figure 5:
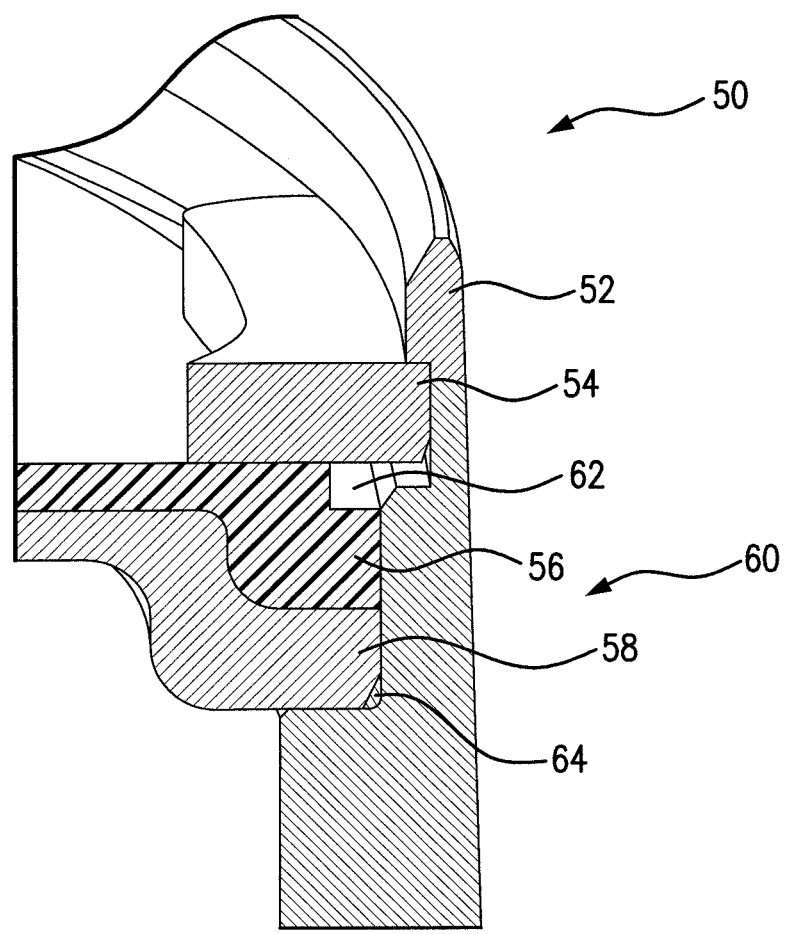
FIG. 5 shows a detail of a further housing for a steering gear.

FIG. 5 shows a detail of a further embodiment of a housing 50 for a steering gear comprising a steering housing 52, a snap-fit element 54, an elastomer layer 56 4, and a base body 58. The base body 58, the snap-fit element 54 and the elastomer layer 56 form the plastic housing 60. It should be noted that no O-ring is provided in this embodiment, and the elastomer layer 56 thus assumes the sealing function. The illustration further shows a groove 62 for the axial elastomer layer 56. In addition, an insertion chamfer 64 can be seen, against which the base body 58 is seated. The sealing function is achieved here by radial compression of the elastomer.

Figure 6:
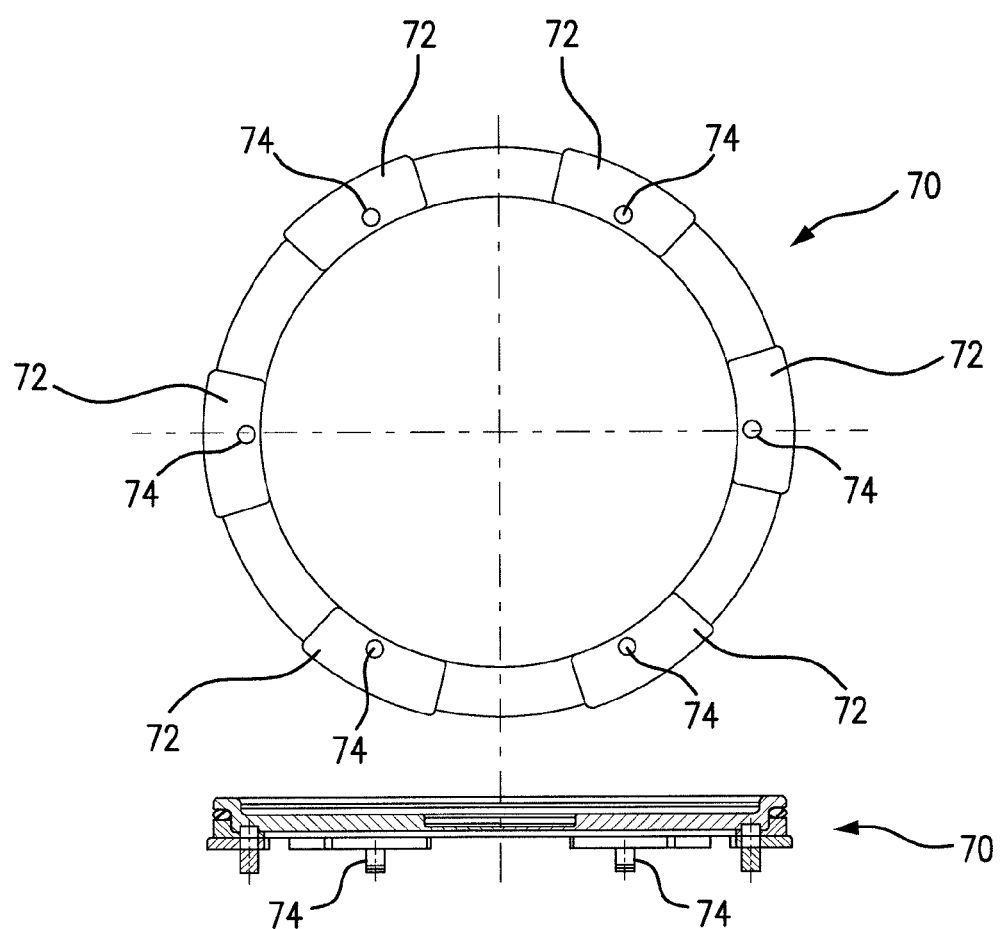
FIG. 6 shows a plan view and a side view of a plastic housing.

FIG. 6 shows a plan view and a lateral sectional view of one embodiment of a plastic housing 70, which in this case is designed as a cover. The illustration further shows snap-fit elements 72, each comprising a pin 74.

FIG. 7 shows a detail view of the design of the plastic housing 70. On the left side, the plastic housing 70 is shown in an unlocked state, and on the right side, it is shown in a secured state. Additionally, an elastomer layer 76, an O-ring 78 and a base body 30 are shown. The illustration further shows a cut-out 90, which accommodates the pin 74.

So as to be able to ensure secure fixation of the plastic housing 70 in the steering housing over the entire service life, latching between the snap-fit element 72 and the base body 80 is thus additionally provided for. In the present case, this latching is provided by the pin 74, which is produced together with the snap-fit elements 72 during the injection molding process. The pins 74 protrude upwardly from the snap-fit elements 72 and are secured in each case to the snap-fit element 72, for example by way of a thin connecting ring. A borehole is located beneath the pins 74 in the snap-fit elements 72 and in the base body 80.

When the pin 74 is pressed into this borehole, the connecting ring breaks, and the pin 74 connects the snap-fit elements 72 to the base body 80. The pin 74 is designed to have a press fit in one of the boreholes, so that it is captively secured. This pressing can additionally be increased by local elevations and recesses in the borehole or in the pin. This can also be achieved by peripheral grooves or flutes. In any case, the snap-fit element 72 is positively latched.

Figure 8:
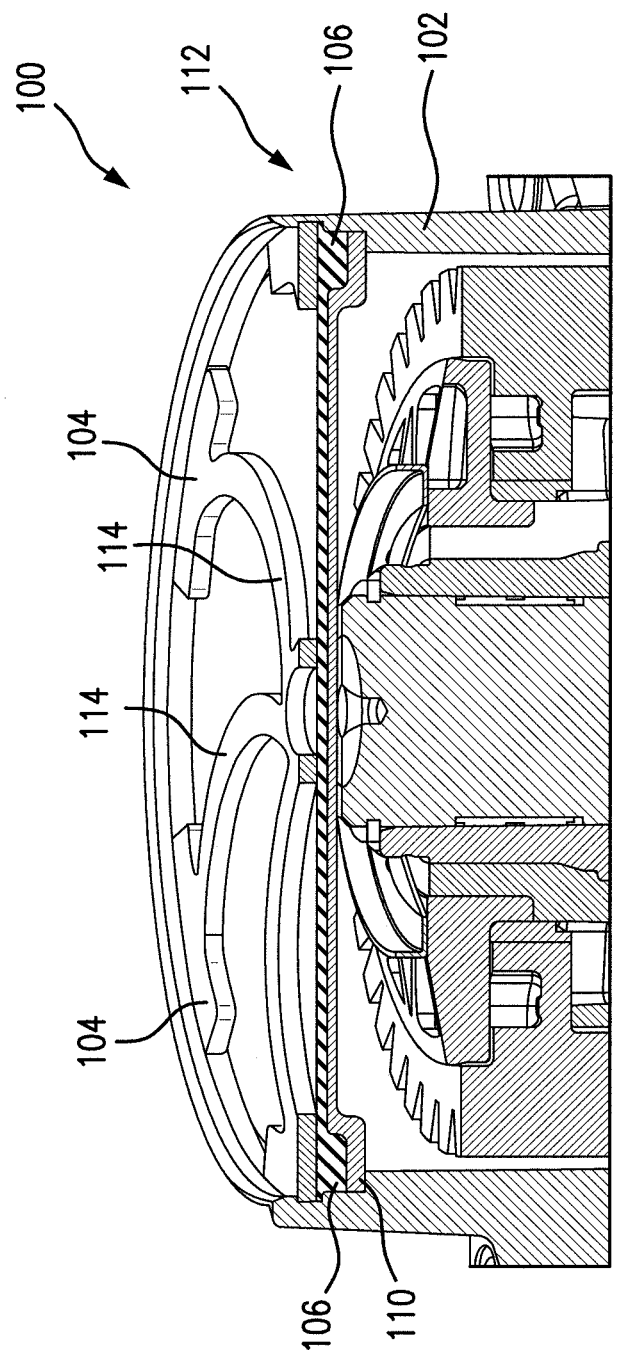
FIG. 8 shows a further embodiment of the described housing for a steering gear.

FIG. 8 shows one embodiment of the described housing 100 for a steering gear. The illustration shows a steering housing 102, made of a metallic material, for example, such as aluminum, snap-fit elements 104, an elastomer layer 106, and a base body 110 made of a plastic material. The snap-fit elements 104, the layer 106, and the base body 110 form a plastic housing 112. Connecting lands 114 can also be seen. The snap-fit elements 104 are non-positively latched by way of the connecting lands 114. The curved shape of the connecting lands 114 gives them the necessary elasticity for installation.

Figure 9:
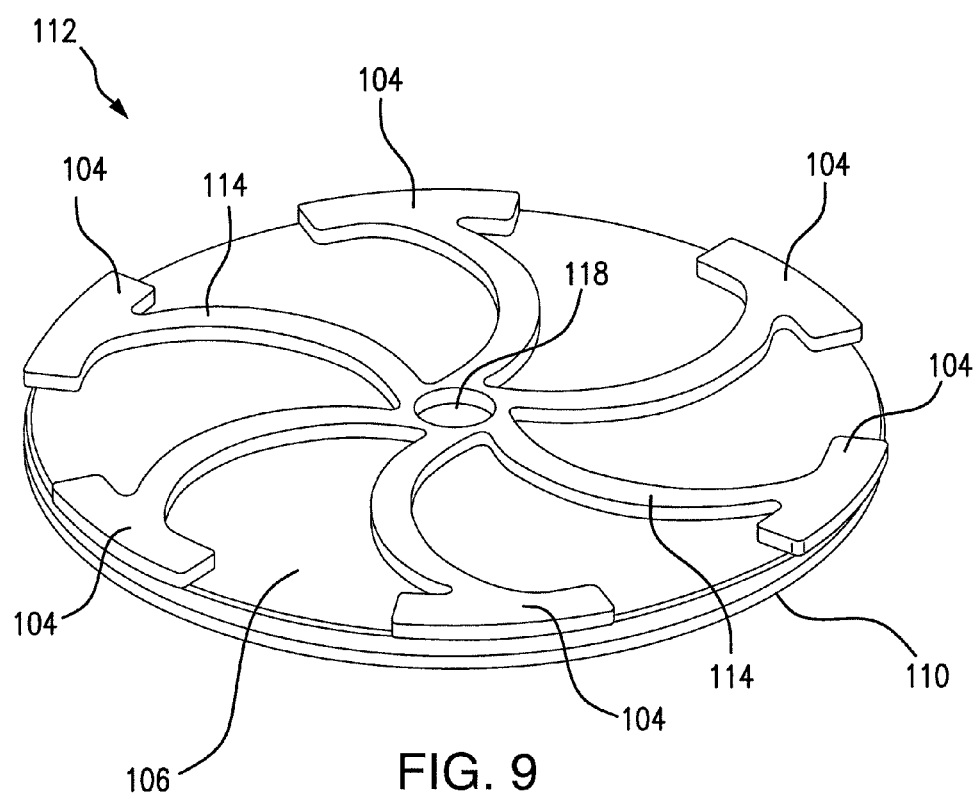
FIG. 9 shows the plastic housing from FIG. 8.

FIG. 9 shows the plastic housing 112 from FIG. 8 with the snap-fit elements 104, which are connected to each other via the connecting lands 114. Sealing is achieved via the compressed elastomer. An axial stop for the plastic housing 112 is present in the steering housing 102. The elastomer layer 106 is axially deformed when the snap-fit element 104 engages in the housing groove.

The snap-fit elements 104 are thus connected to each other via the curved connecting lands 114. The connecting lands 114 have a shared center 118, from which they transition in a curved arcuate shape into the snap-fit elements 104.

When the plastic housing 112, which represents a cover, is installed, the snap-fit elements 104 move inward. In the process, the curved connecting lands 114 elastically deform. The snap-fit elements 104 then engage in the steering housing groove, wherein the connecting lands 114 press the snap-fit elements 104 into the groove. These tensioned connecting lands 114 thus ensure that the snap-fit elements 104 remain securely engaged in the steering housing groove over the service life.

The snap-fit elements 104 are connected via the connecting lands 114 and can thus be inexpensively produced as one component. Since the snap-fit elements 104 are one component, the same can be easily connected to the base body 110 via the elastomer layer 106. This design of the plastic housing 112 is very suitable when the housing is a flat cover disk.

Figure 10:
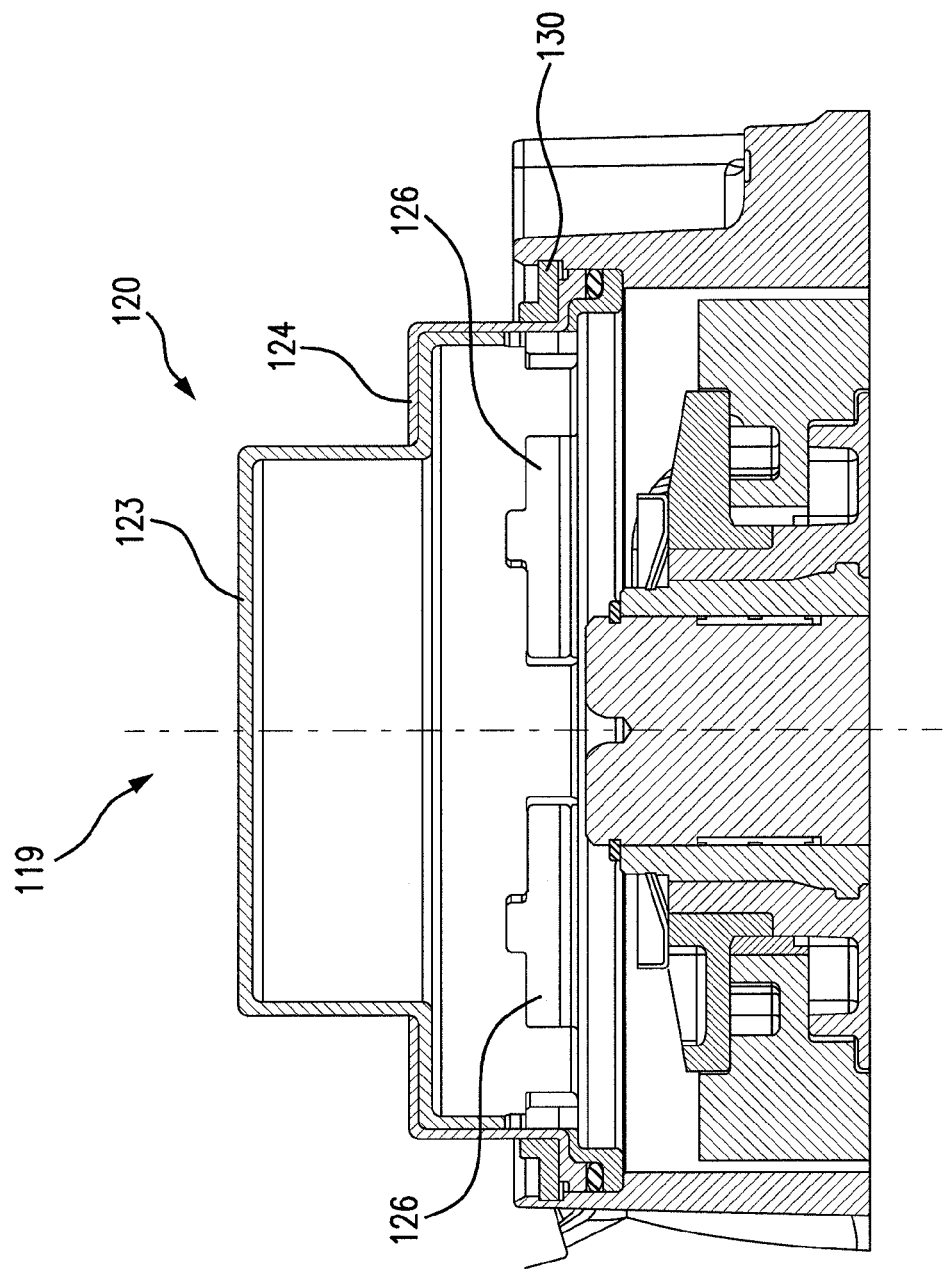
FIG. 10 shows a further embodiment of the presented housing.

FIG. 10 shows a further embodiment of the housing 119 comprising a plastic housing 120, which encloses a volume, a base body 123 and an elastomer layer 124. In addition, apertures 126 can be seen in the base body 123, which are covered by the elastomer layer 124. The plastic housing 120 is defined by the base body 123 and the elastomer layer 124. The plastic housing 120, which in this case is cylindrical, is installed in the steering housing, wherein the snap-fit elements 130 can move radially against the elastomer layer 124 into the apertures 126 in the base body 123. Sealing is achieved via the radially compressed elastomer and/or an O-ring. An axial stop is provided in the steering housing for the plastic housing 120, which forms a plastic assembly. The elastomer layer 124 is axially deformed when the snap-fit element engages in the housing groove.

Figure 11:
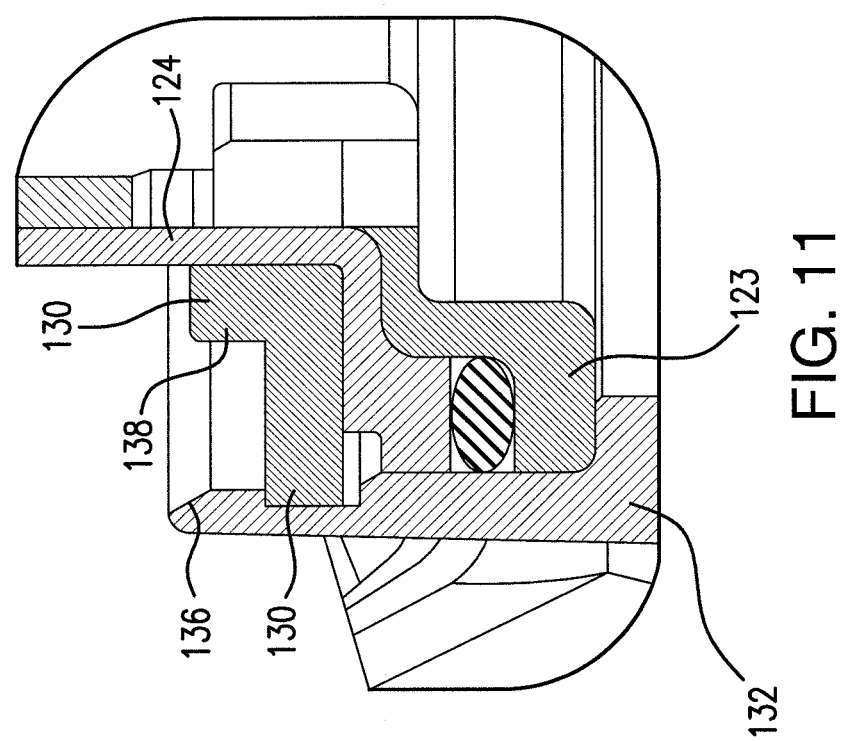
FIG. 11 shows a detail of FIG. 10.

FIG. 11 shows a detail of FIG. 10. The illustration shows a snap-fit element 130 having a lug 138, the elastomer layer 124, the base body 123 and a metallic body 132 as the steering housing. The illustration further shows an insertion chamfer 136.

Figure 12:
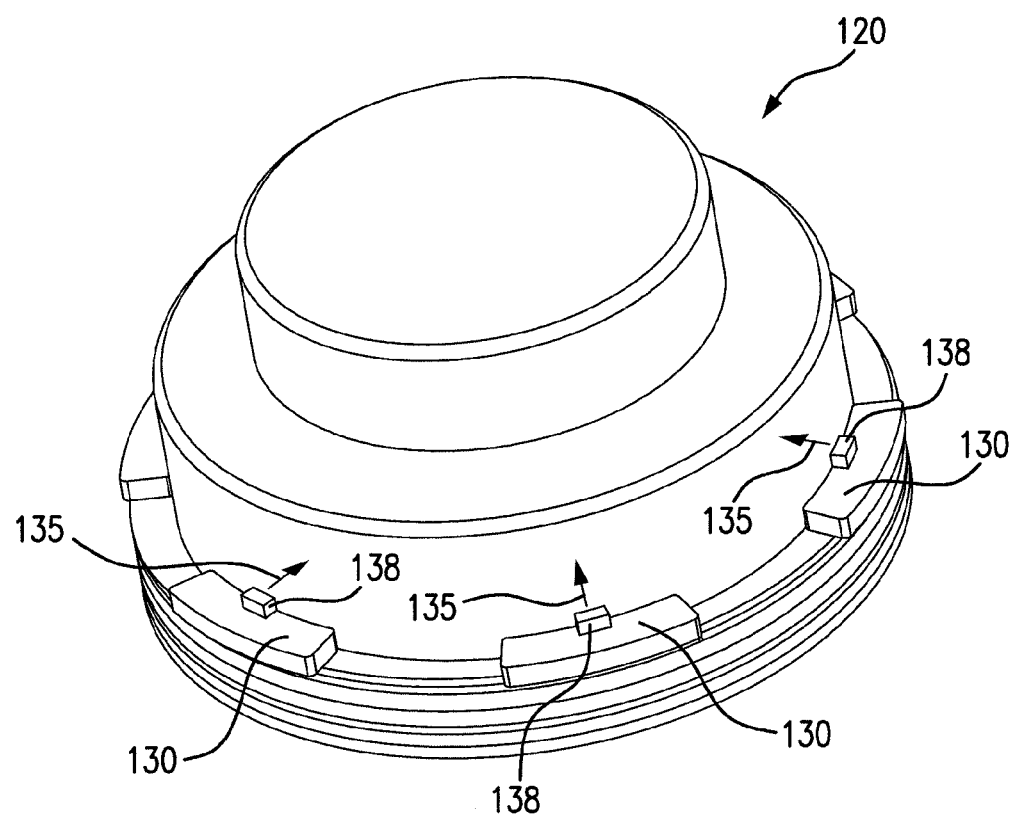
FIG. 12 shows a perspective view of the plastic housing from FIG. 10.

The plastic housing 120, which is designed as a cover, is shown in a perspective view in FIG. 12. The snap-fit elements 130 comprising the lugs 138 can be seen. For removal, these must be moved inward, in the direction of the arrows 135.

Figure 13:
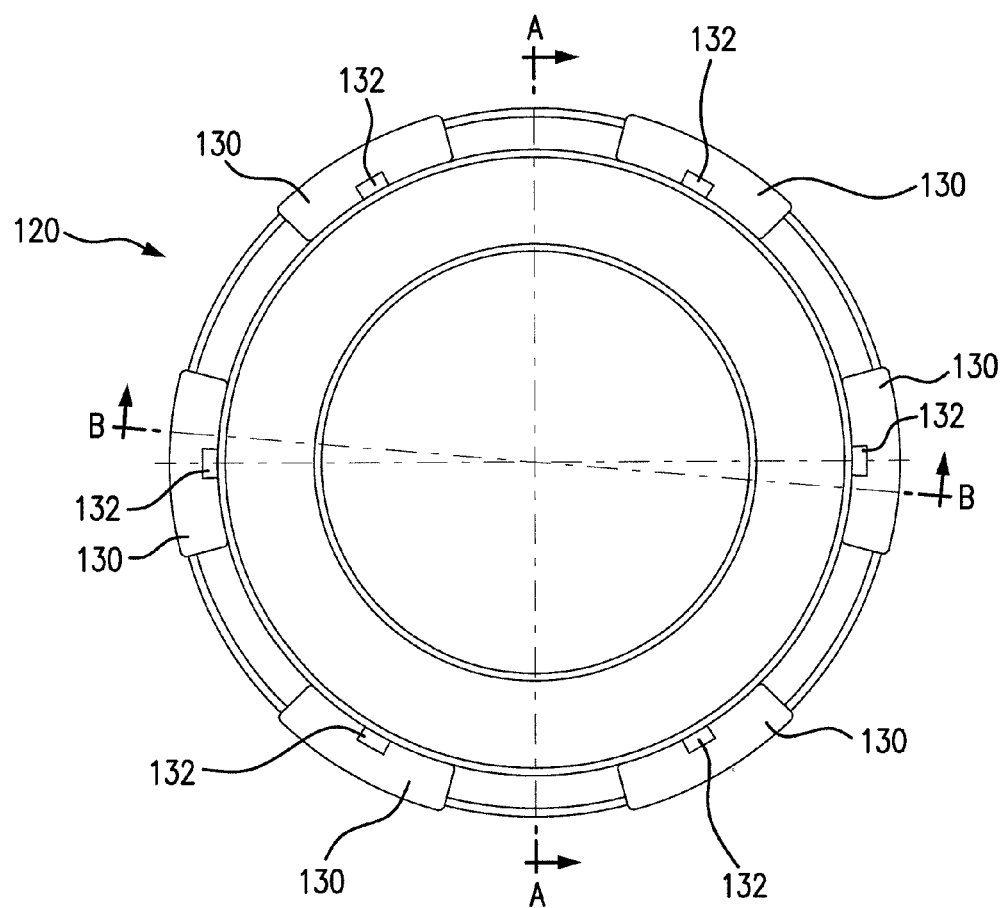
FIG. 13 shows a plan view of the plastic housing from FIG. 10.
Figure 14:
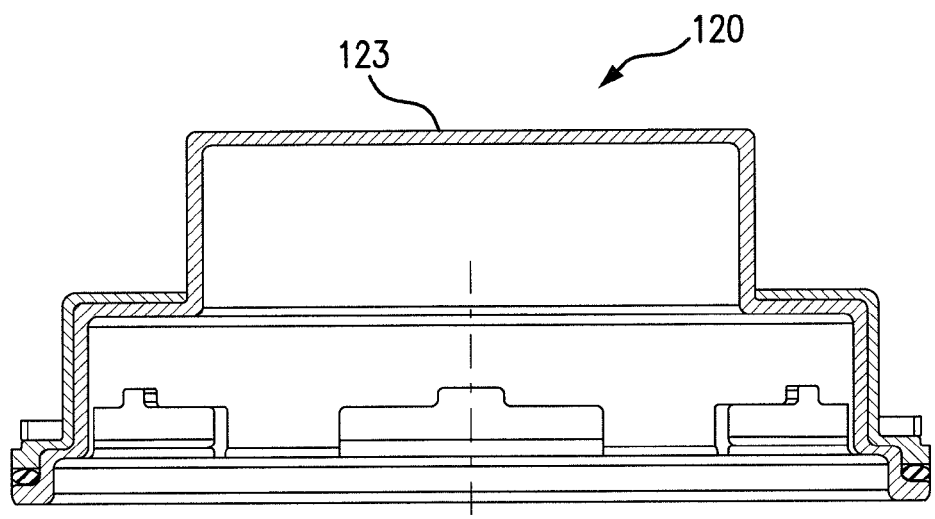
FIG. 14 shows a sectional view of the plastic housing.
Figure 15:
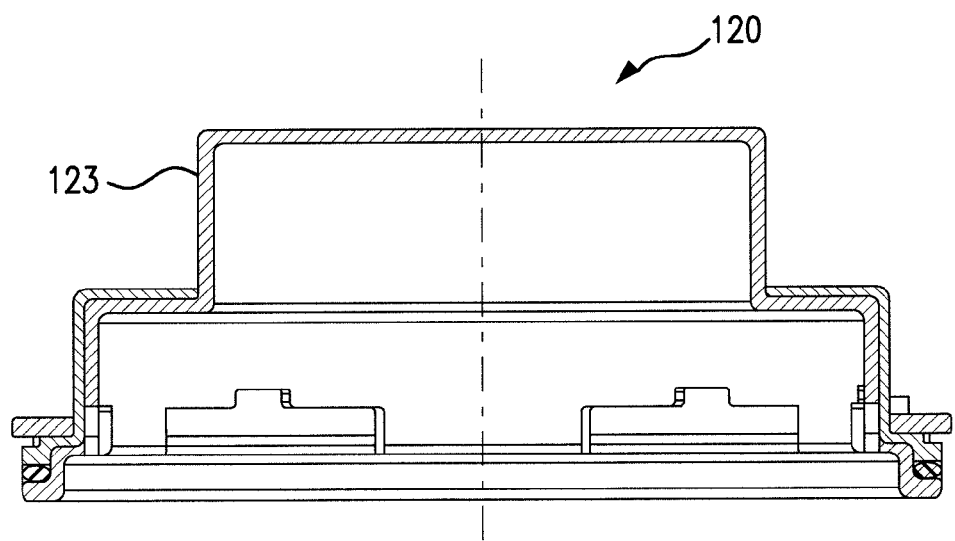
FIG. 15 shows a further sectional view.

FIG. 13 shows a plan view of the plastic housing 120, and FIGS. 14 and 15 each show a cut side view of the plastic housing 120.

When the plastic housing 120 is installed, the snap-fit element 130 moves inward. The snap-fit elements 130 recede inward into cut-outs in the base body 123. The elastomer layer 126 covers the cut-outs in the base body 123. The elastomer layer 126 is expanded in the process, pressing the snap-fit elements 130 outward into the steering housing groove. The tensioned elastomer layer 126 ensures that the snap-fit elements 104 remain securely engaged in the steering housing groove over the service life.

This design allows a steering housing to be connected to a cylindrical plastic housing 120 in a small installation space by way of a snap-fit connection.

FIG. 16 shows a further embodiment of the housing, which, in the overall, is denoted by reference numeral 150. This housing 150 comprises a plastic housing 152, which cooperates with a steering housing 154. In addition, a multi-piece latching element 156, a locking bar slide 157, an elastomer layer 158, an O-ring 160, and a base body 162 are shown. FIG. 16 shows the locked state.

FIG. 17 shows a detail of FIG. 16. It can be seen how the latching element 156 engages in a steering housing groove 164.

In this embodiment, the plastic housing 152 is installed in the steering housing 154. The locking bar elements, which form the latching element 156, are pushed into the steering housing groove 164. The locking bar slide 157 has reached the final position. Sealing is achieved via the O-ring 160 and/or via the compressed elastomer layer 158. The elastomer layer 158 is axially deformed in the process when the latching element 157 is pushed into the steering housing groove 164. As a result, the plastic housing 152 is seated without play in the steering housing 154 and cannot cause any rattling noise.

Figure 18:
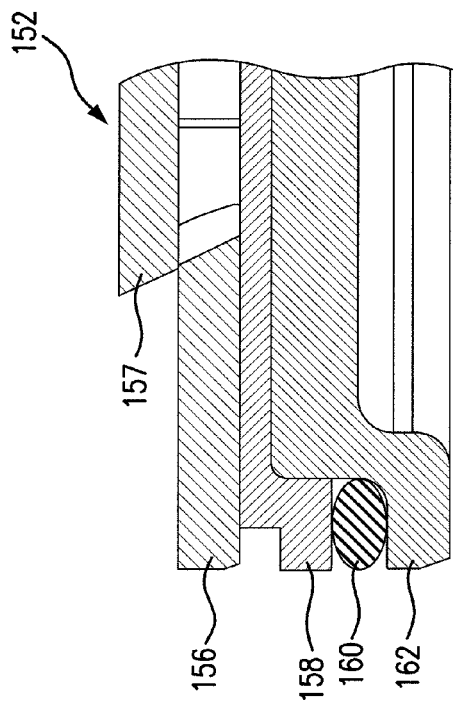
FIG. 18 shows the plastic housing from FIG. 16.

FIG. 18 shows the plastic housing 152 in the non-latched state.

The illustration shows the plastic housing 150 before installation into the steering housing 154. The locking bar elements 156 do not protrude over the base body 162. During installation of the plastic housing 152 into the steering housing 154, no engagement takes place. The locking bar slide 157 is in its starting position before installation of the plastic housing 152. The elastomer layer 158 is axially deformed when the latching element 156 engages in the steering housing groove 164. A groove or recess is provided in the elastomer layer 158, which is able to accommodate the displaced elastomer when installed.

Figure 19:
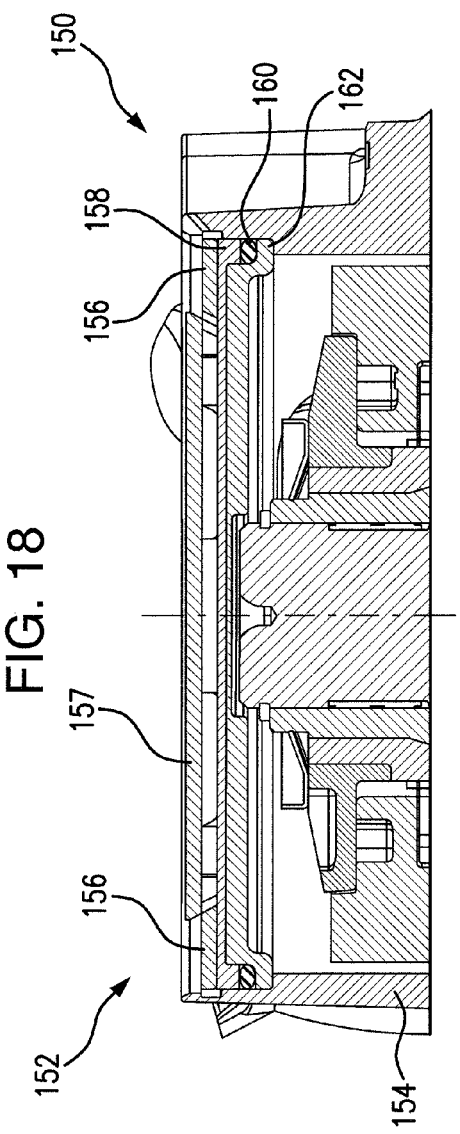
FIG. 19 shows the plastic housing.

FIG. 19 shows the plastic housing 152 of this embodiment in the non-latched state.

Figure 20:
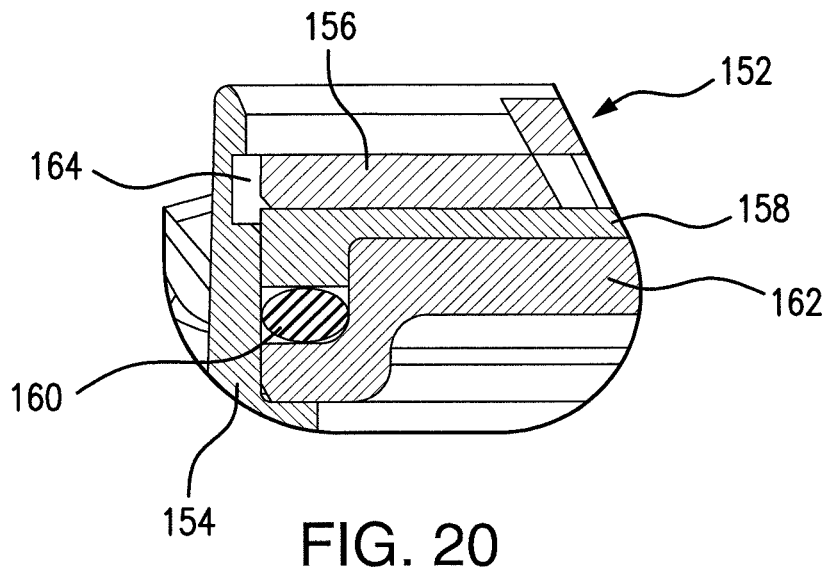
FIG. 20 shows a detail of FIG. 19.

FIG. 20 shows a detail from FIG. 19 and thus likewise the non-latched state. The illustrated locking bar element of the latching element 156 does not engage in the steering housing groove 164.

Figure 21:
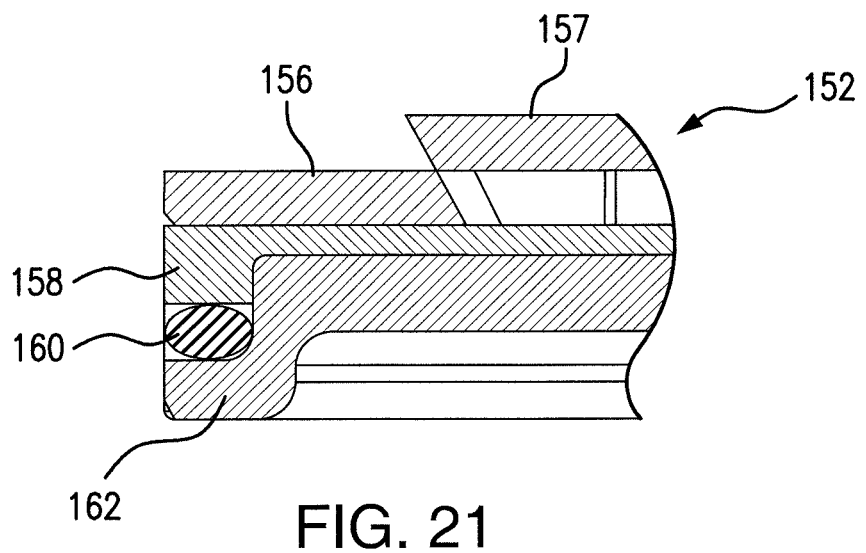
FIG. 21 shows the plastic housing.

FIG. 21 again illustrates the plastic housing 152 in the non-latched state.

Figure 22:
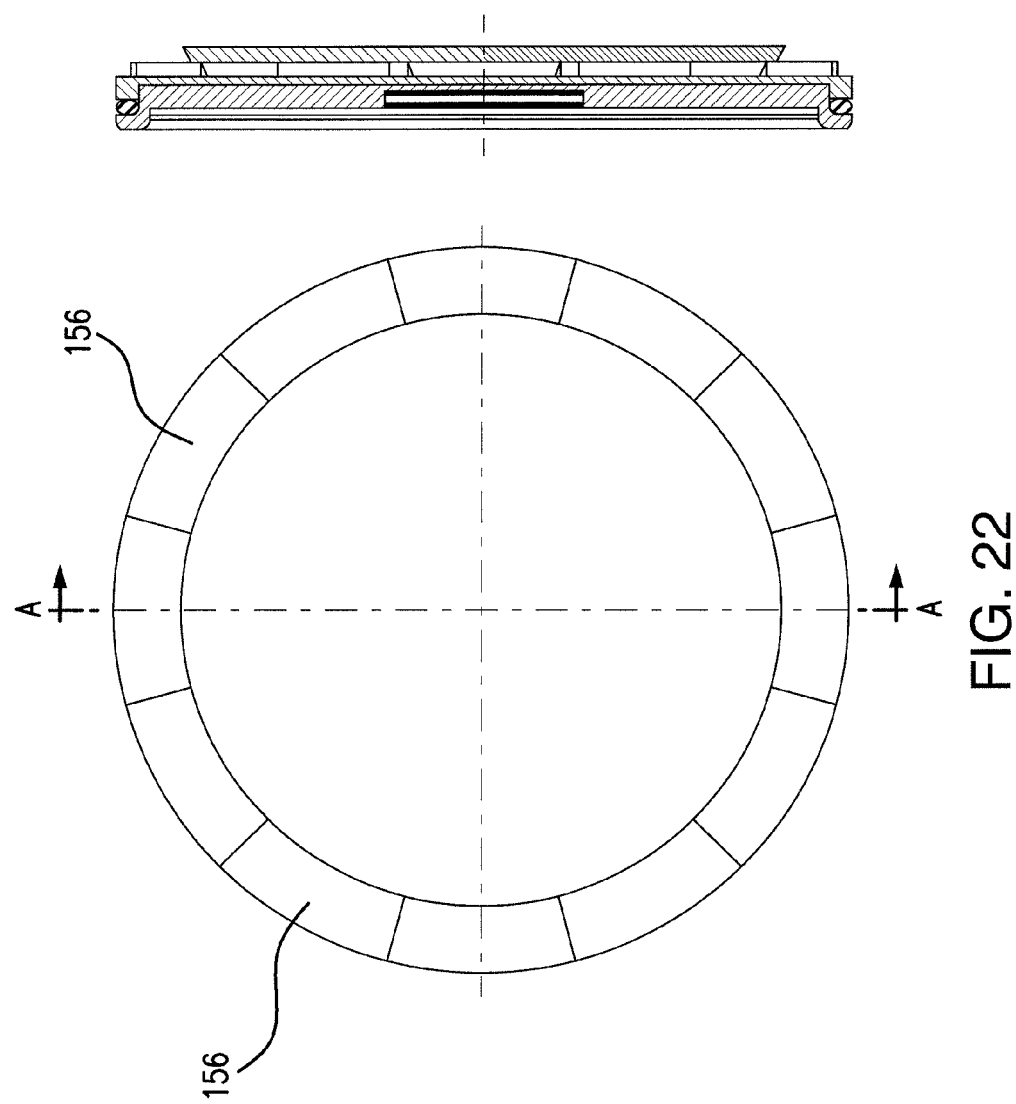
FIG. 22 shows a plan view of the plastic housing.

FIG. 22 shows a plan view and a cut side view of the plastic housing 152. The multi-piece latching element 156, which is composed of multiple locking bar elements that are distributed over the circumference, is clearly apparent.

In the locking bar function, the elastomer layer 158 can achieve the necessary deformation of the locking bar elements with respect to the base body 162 in a small installation space, without exceeding the permissible expansion. So as to fix the plastic housing 152 without play in the steering housing 154, the dimensioning of the components can be selected so that the locking bar elements, when installed, are axially prestressed when they are pushed into the steering housing groove 164. This is achieved by axially compressing the elastomer layer 158. A groove or recess is present for this purpose in the elastomer layer 158 and, when installed, is able to accommodate the elastomer, which is displaced by the compression.

The locking bar elements are moved by the locking bar slide 157 so that the locking bar elements engage in the groove 164 of the steering housing. The locking bar slide 157 can be a separate component or form one component together with the locking bar elements via a connecting land. The connecting land breaks when the locking bar slide 157 is moved. When the locking bar slide moves in the direction of the base body, the locking bar elements are pushed outward as a result of the chamfer. When the locking bar slide 157 has reached the final position, the same can engage in an undercut on the base body 162 or on the locking bar element, so that the locking bar elements remain engaged in the steering housing groove 164.

The locking bar slide 157 can also be designed so that, as a result of rotational movement, it moves the locking bar elements outward and pushes these into the steering housing groove 164. When the locking bar slide 157 has carried out the necessary rotational movement, the same can latchingly engage with the base body 162 or the locking bar element by way of positive fit. The latched state is thus indicated and secured.

As a result of a movement of the locking bar slide 157, the locking bar elements are moved so that these generate a positive fit with respect to the steering housing 154. The locking bar slide 157 and/or the locking bar elements can include molded elements that allow a movement of the elements. In this way, it is possible to remove the plastic housing.

Figure 23:
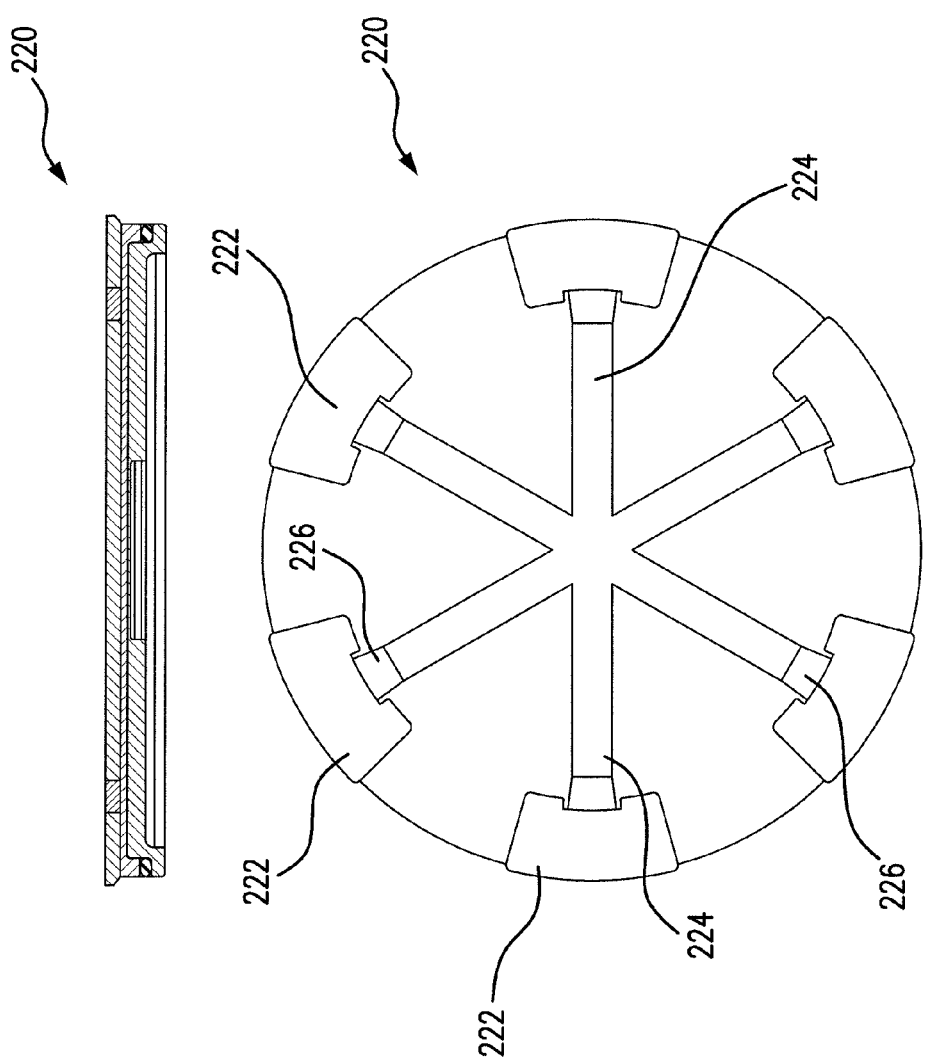
FIG. 23 shows a plastic housing.

FIG. 23 shows a plan view and a sectional side view of one embodiment of the plastic housing 220 in the latched state. The illustration further shows locking bar elements 222, support elements 224 and locking bar slides 226.

FIG. 24 shows the plastic housing 220 installed in the steering housing 230. The locking bar elements 222 are pushed into the steering housing groove here. The locking bar slide 226 has reached its final position. Sealing is achieved via an O-ring 228 and/or via a compressed elastomer layer 232. This layer is axially deformed when the locking bar element 222 is pushed into the steering housing groove. As a result, the plastic housing 220 is seated without play in the steering housing 230 and cannot cause any rattling noise. Moreover, a base body 234 can be seen.

FIG. 25 shows a detail of the plastic housing 220 in the latched state.

Figure 26:
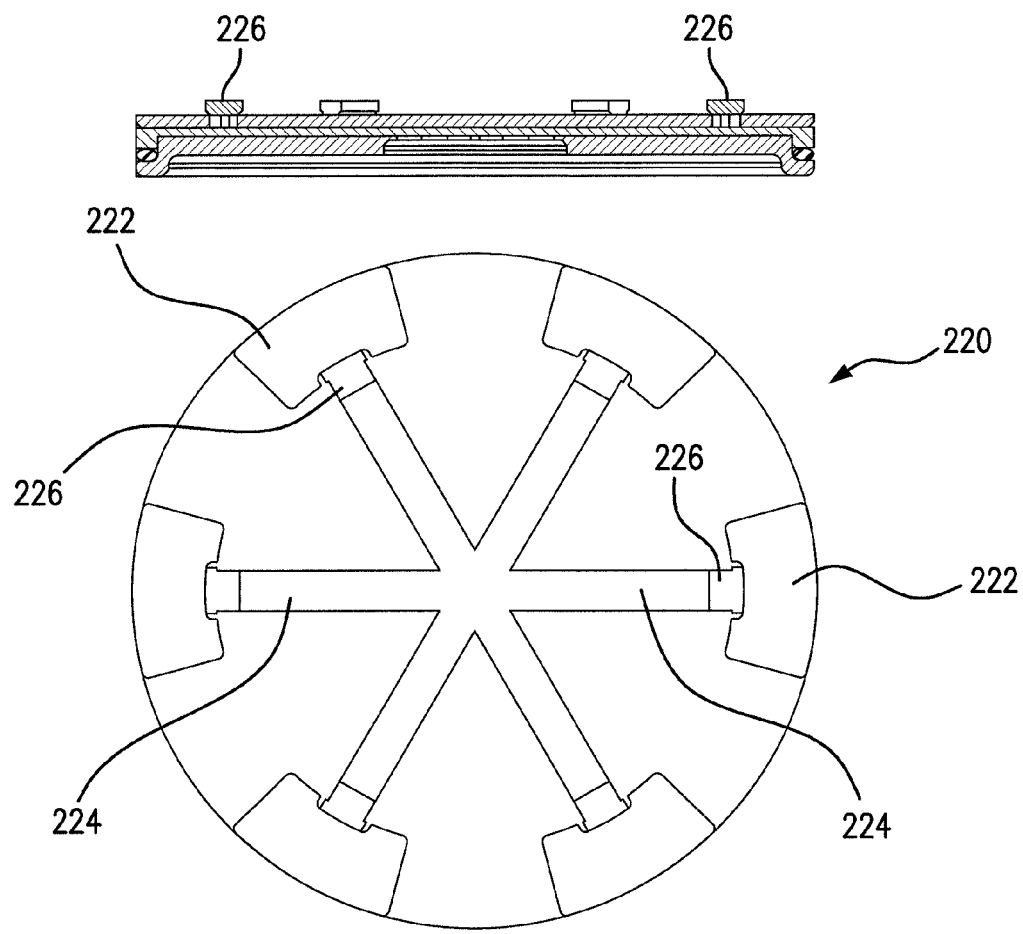
FIG. 26 shows the plastic housing.

FIG. 26 shows a plan view and a sectional view of the base body 220 in the unlatched state.

Figure 27:
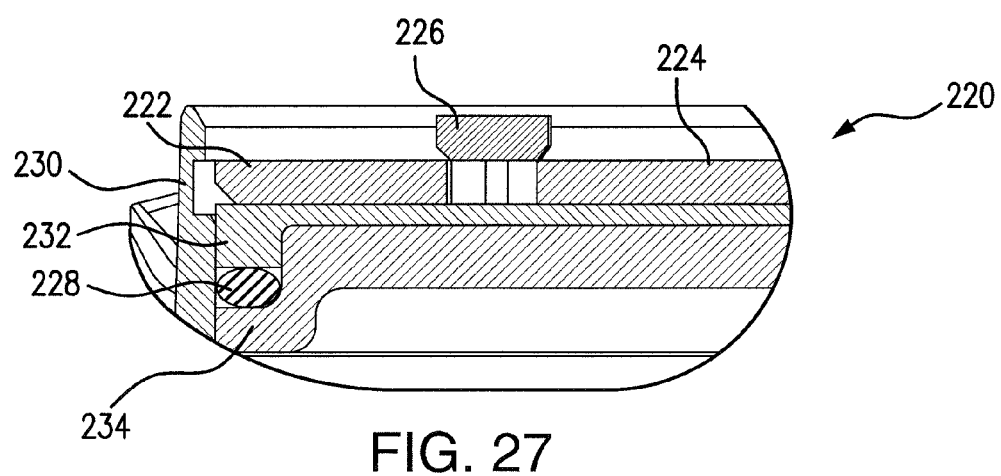
FIG. 27 shows the plastic housing.

FIG. 27 shows the plastic housing 220 comprising the support element 224, the locking bar slide 226, which is designed as an insertable dowel, the locking bar element 222, the elastomer layer 232, the O-ring 228, and the base body 234.

The plastic housing 220 is installed in the steering housing, without the locking bar elements 222 being displaced by the locking bar slide 226. The locking bar elements 222 are not pushed into the steering housing groove. The locking bar slide 226 is in the starting position. The locking bar elements 222 do not protrude over the base body 234. During installation of the plastic housing 220 into the steering housing, no engagement takes place. The locking bar slide 226 assumes its starting position prior to installation of the plastic housing 220. The elastomer layer 232 is axially deformed when the locking bar element 222 engages in the steering housing groove. A groove or a recess is present in the elastomer layer 232, which is able to accommodate the displaced elastomer when installed.

The locking bar elements 222 are moved by the locking bar slide 226 so that the locking bar elements 222 engage in the groove of the steering housing. Each locking bar element 222 has a dedicated locking bar slide 226, which has a conical design on the end face facing the base body 234. When the locking bar slides 226 are moved in the direction of the base body 234, the locking bar elements 222 are pushed radially outward because the locking bar slides 226 are guided on a support element 224 on the side opposite the locking bar elements 222. Displacement of the support element 224 relative to the base body 234 can be prevented by appropriate design and by appropriately positioning the support element 224 on the plastic housing 220.

The locking bar slide 226 can, in each case, be a separate component, or it is possible for all locking bar slides 226 to be connected among each other so as to expedite the installation process. Moreover, the locking bar elements 222, the locking bar slides 226 and the support element 224 can be connected to each other by thin connecting lands or predetermined breaking points, so as to simplify the production and installation process. These predetermined breaking points then break during installation of the plastic housing 220 when the locking bar slides 226 are pushed in the direction of the base body 234 with a defined force.

After the plastic housing 220 has been inserted into the steering housing, the locking bar slides 226 are pressed in the direction of the base body 234 with a defined force. The locking bar slides 226 are pushed between the locking bar elements 222 and the support element 224 in the process. Due to the geometry of the locking bar elements 222, in conjunction with the non-displaceable support element 224, the locking bar elements 222 are pushed radially outward into the steering housing groove. The contact surfaces between the locking bar slides 226 and the locking bar elements 222 and/or the support element 224 can include elevations and/or recesses or undercuts, so that the locking bar slides 226 remain in the lower position, and are thus securely engaged in the steering housing groove. The locking bar slides 226 can include molded elements that allow them to be pulled out. In this way, it is possible to remove the plastic housing 220.

Figure 28:
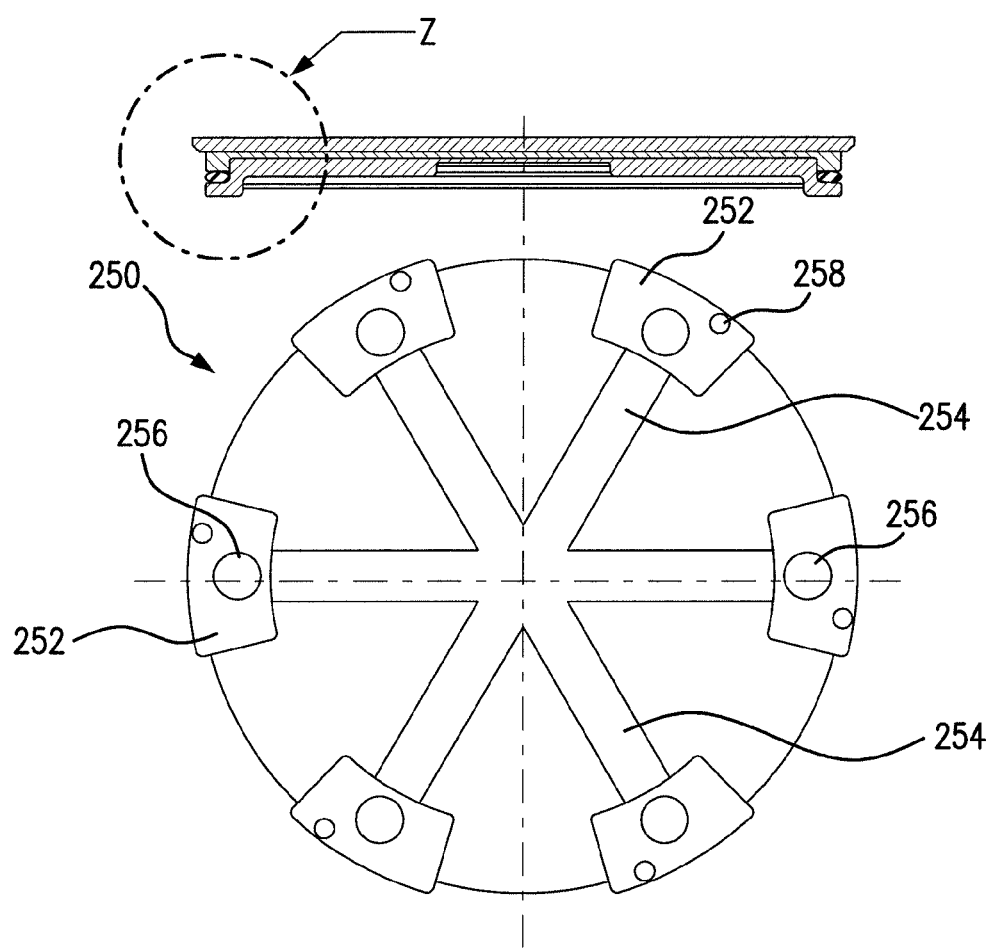
FIG. 28 shows one embodiment of the plastic housing.

FIG. 28 shows a plan view and a sectional view of a plastic housing 250, comprising snap-fit elements 252, connecting lands 254, openings 256 for an installation tool, and anti-turn mechanisms 258. This plastic housing 250 is designed for rotation.

Figure 29:
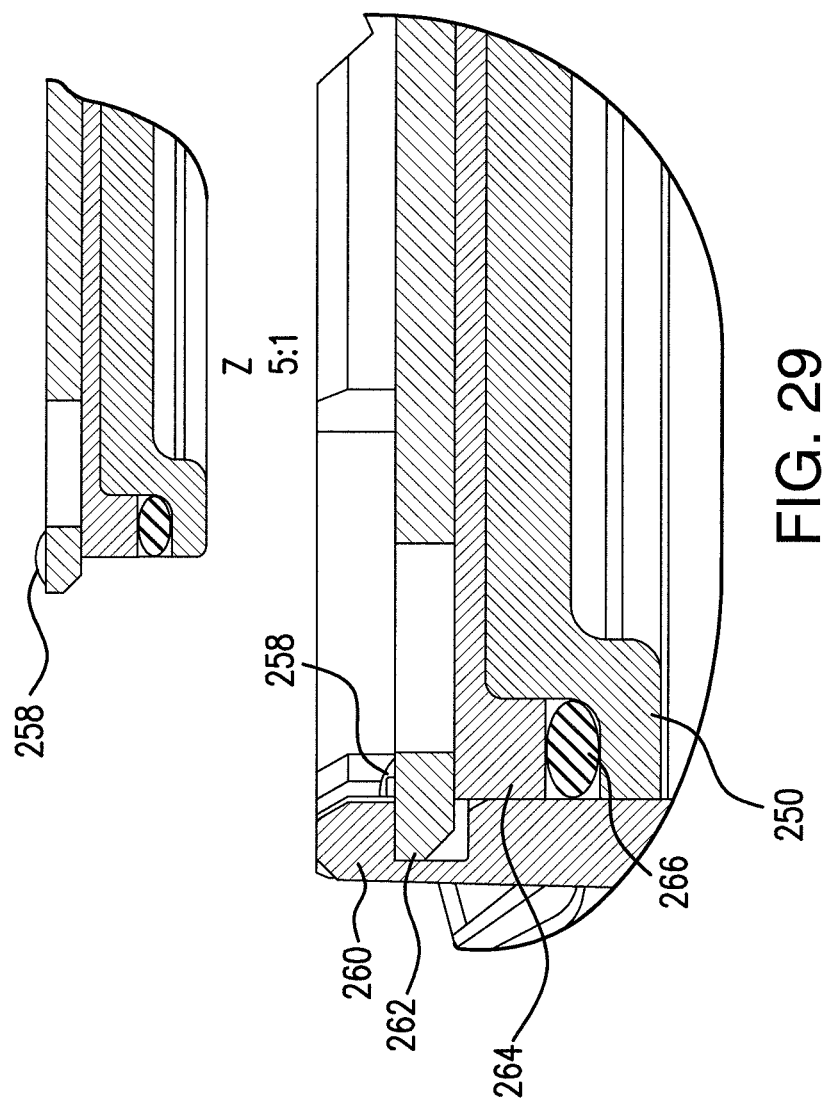
FIG. 29 shows a detail of FIG. 28.

FIG. 29 shows this plastic housing 250 together with the steering housing 260. The illustration further shows a locking bar element 262, an elastomer layer 264 and an O-ring 266.

Figure 30:
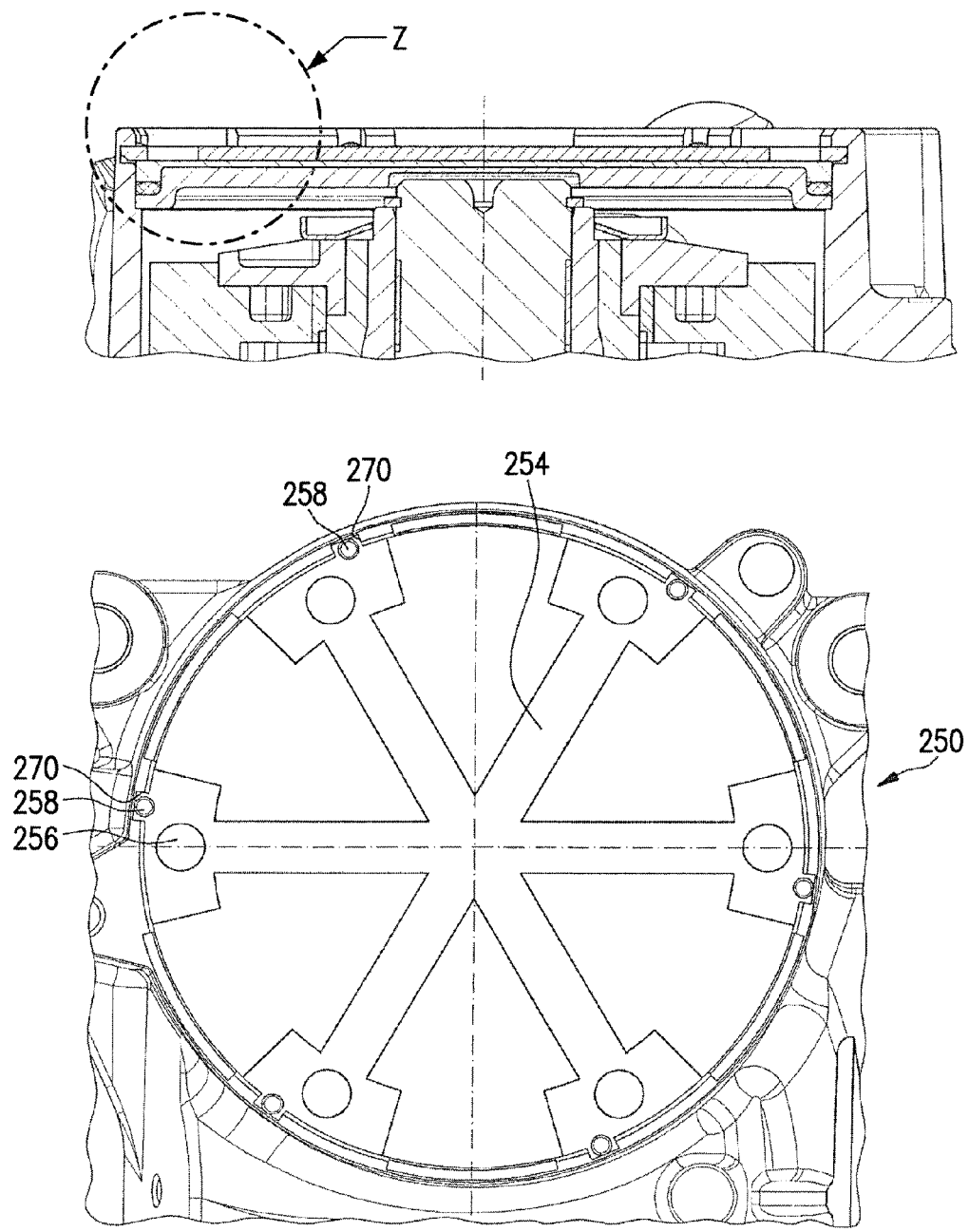
FIG. 30 shows the plastic housing.
Figure 31:
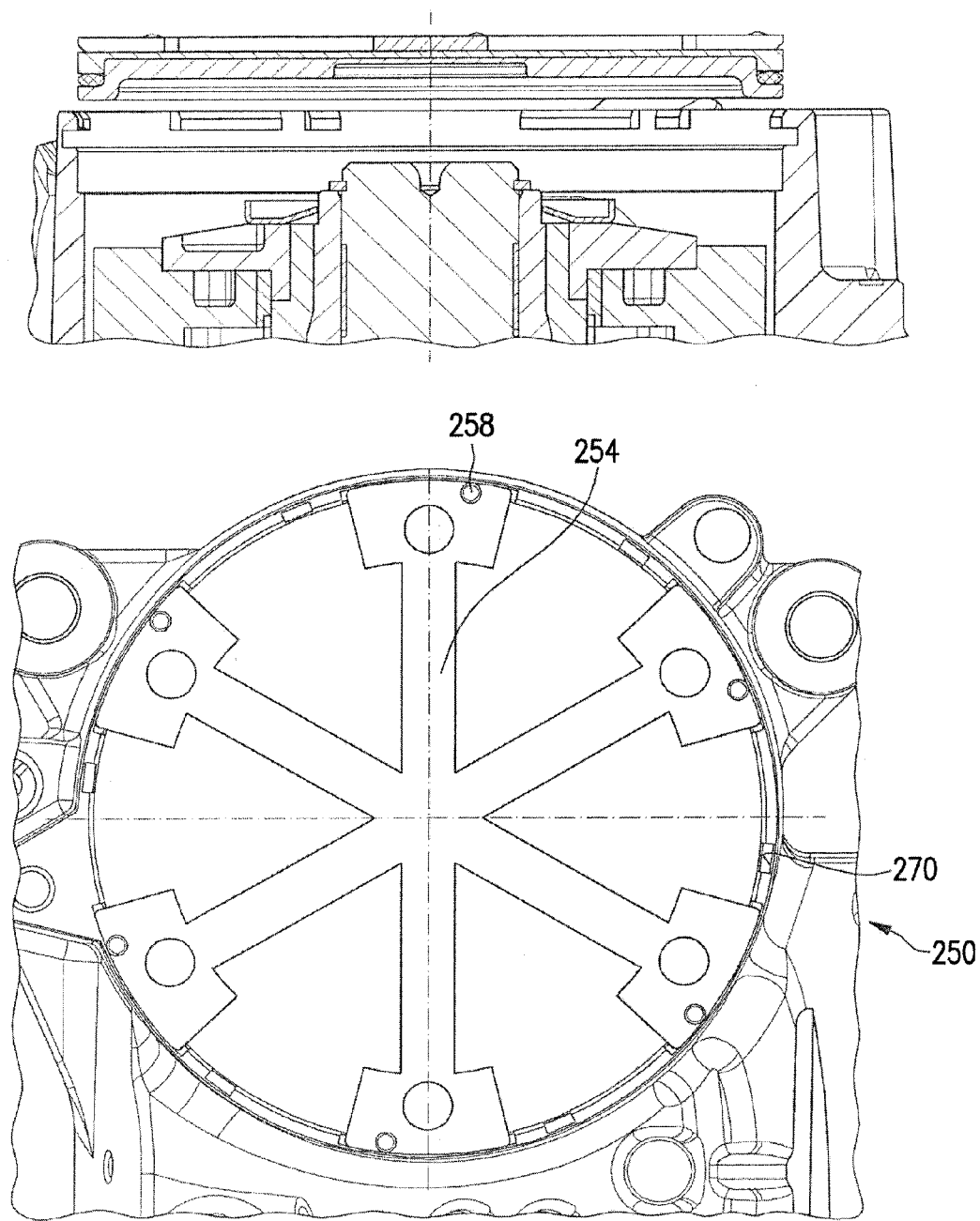
FIG. 31 shows the plastic housing.

Other illustrations are provided in FIG. 30, which shows the rotated final state having anti-turn mechanisms or rotating elements 258 engaged in grooves 270, and in FIG. 31, in which the plastic housing 250, designed as a cover, has been attached, but not rotated yet. FIG. 30 thus shows the plastic housing 250 in the steering housing in a position after installation; FIG. 31 shows the position prior to installation.

Figure 32:
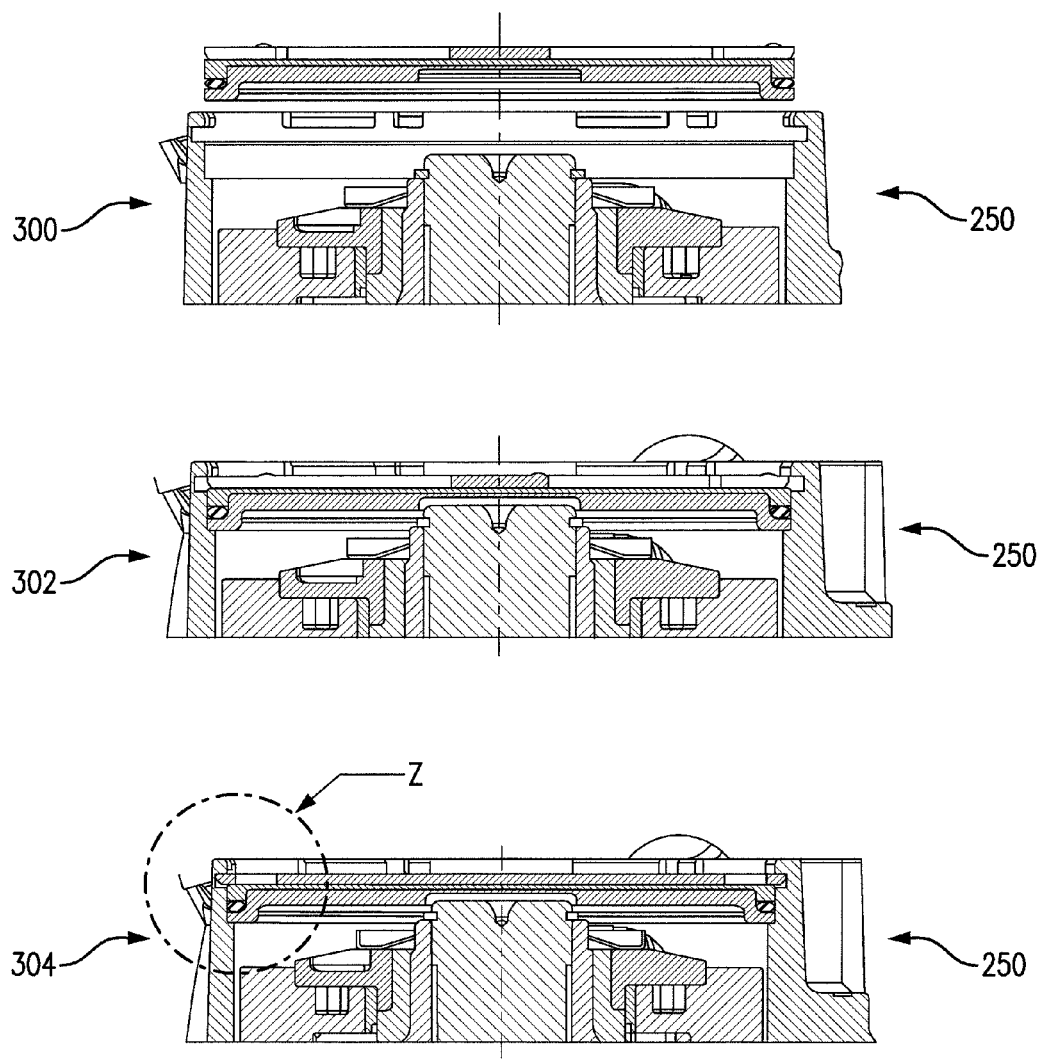
FIG. 32 shows installation steps.

FIG. 32 shows the installation itself, which is to say a first step 300, in which the plastic housing 250 is fed and the rotating elements of the plastic housing 250 are oriented in the direction of the cut-out of the steering housing; a second step 302, in which the plastic housing 250 is axially displaced to the end stop in the steering housing; and a third step, in which the plastic housing 250 is rotated relative to the steering housing with a defined rotational angle.

So as to fix the plastic housing 250 without play in the steering housing, the dimensioning of the components can be selected so that the rotating elements, when installed, are axially prestressed when they are engaged in the steering housing groove. This is achieved by axially compressing the elastomer layer. A groove or a recess is provided for this purpose in the elastomer layer, which is able to accommodate the elastomer when installed, which is displaced by the compression.

The diameter of the rotating elements connected to the plastic housing 250 is slightly larger than the outer diameter of the base body. The rotating elements protrude radially over the base body, corresponding to the groove depth in the steering housing. The regions in which the rotating elements of the plastic housing 250 are located are appropriately left open, so that the plastic housing 250 can be inserted into the steering housing in the axial direction. After the plastic housing 250 has been inserted into the steering housing, the plastic housing 250 is rotated by a defined angle. The rotating elements of the plastic housing 250 are pushed into the grooves of the steering housing and the housings are thus fixed to each other.

So as to prevent this connection from loosening during operation, the rotating elements can have axial elevations and/or recesses. These elevations or recesses are located on the side of the rotating elements facing away from the base body and correspond to appropriate elements of the steering housing. In this way, it is ensured that the plastic housing 250 remains in this position over the entire service life and is thus securely engaged in the steering housing groove.

The rotation of the plastic housing 250 during installation can be carried out by way of a tool, which engages in openings and/or elevations provided on the rotating elements, for example.

Figure 33:
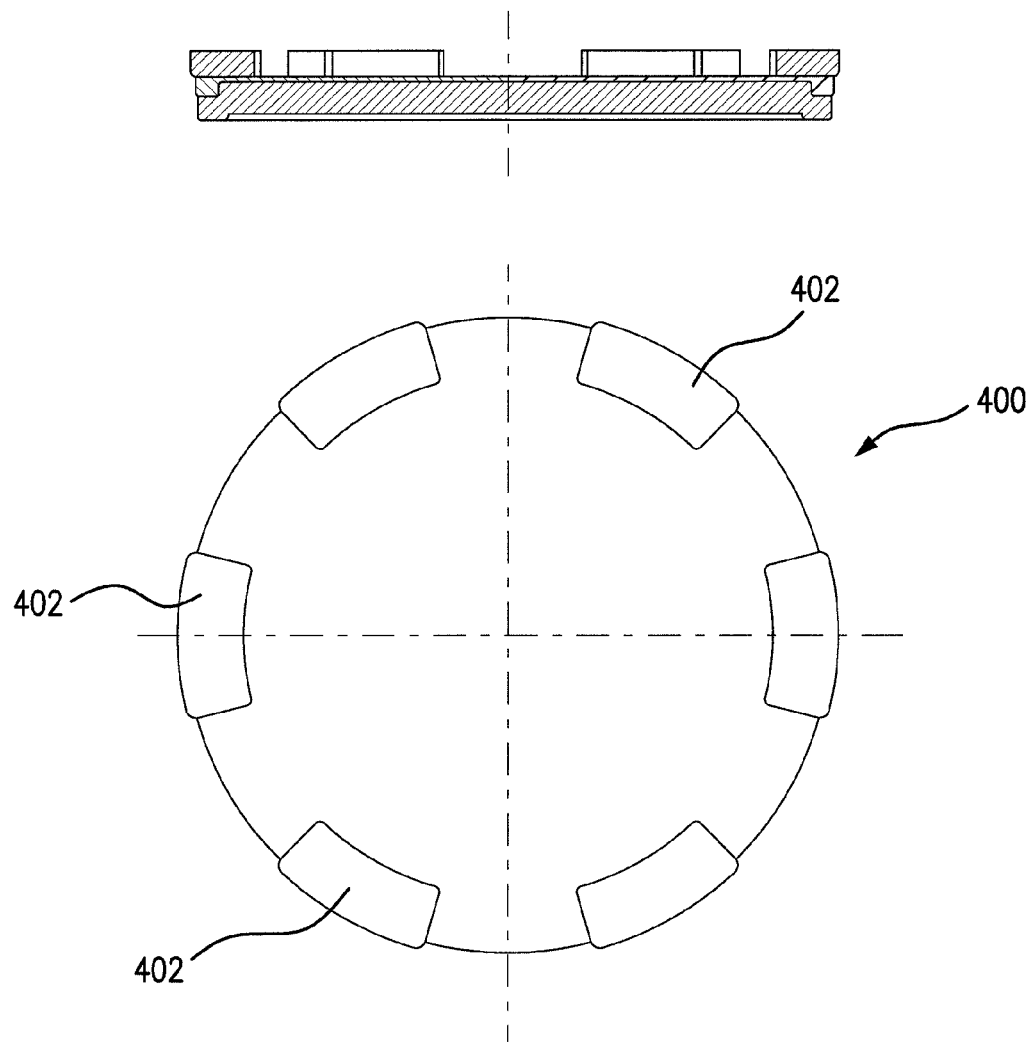
FIG. 33 shows a plastic housing.

FIG. 33 shows a plan view and a sectional view of one embodiment of a plastic housing, which, in the overall, is denoted by reference numeral 400. In addition, snap-fit elements 402 are provided on the circumference.

Figure 34:
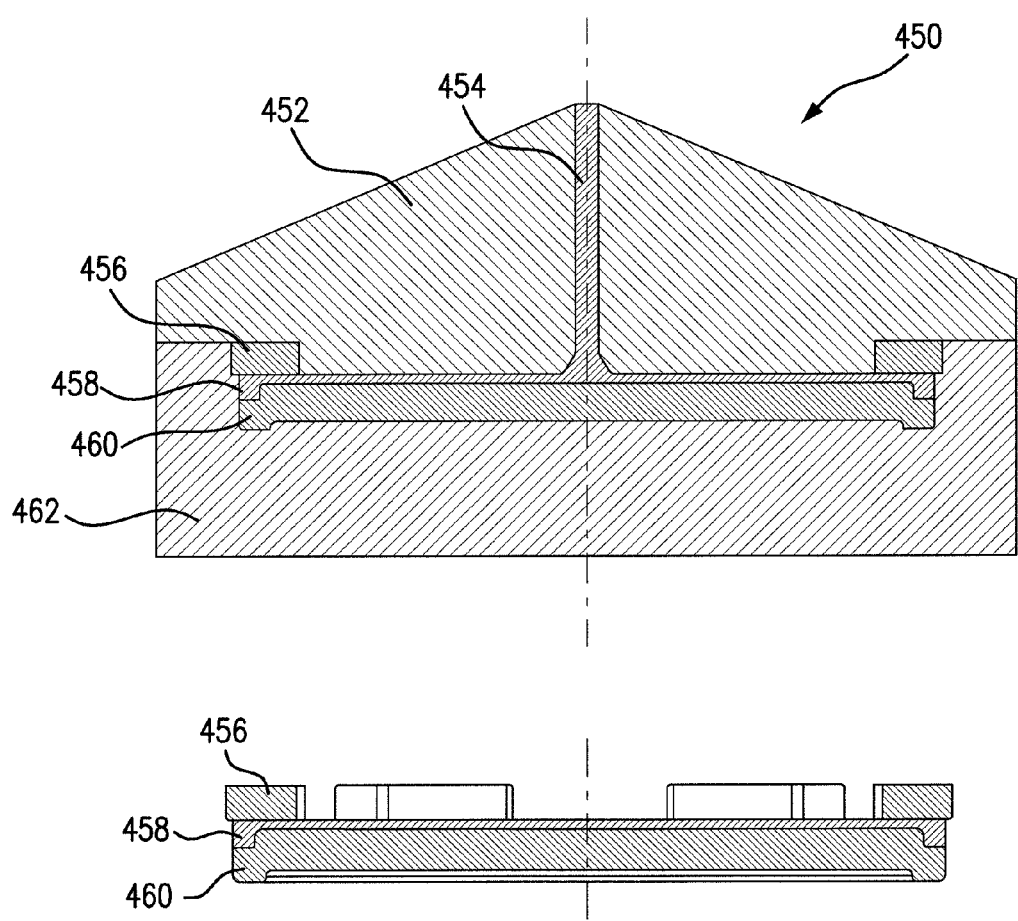
FIG. 34 shows a system for production.

FIG. 34 shows a system for applying an elastomer layer, which, in the overall, is denoted by reference numeral 450. The illustration shows an upper mold part 452, a runner 454, a locking bar and/or snap-fit element 456, an elastomer layer 458, a base body 460, and a lower mold part 462.

The base body 460 and the snap-fit or locking bar elements 456 can thus be produced in a first injection molding process from a reinforced material. Thereafter, these two components are joined to the elastomer layer in a second injection molding process.

The base body 460 and the snap-fit and/or locking bar elements 456 can be produced using various gating process, such as by way of a sprue gate or diaphragm gate. In the second injection molding process, when the elastomer layer 458 is injection-molded between the two reinforced components, however, a gating process using a central runner in the axial center should be used, which fills the cavity evenly over the entire circumference, for example a sprue gate or a diaphragm gate. It is thereby ensured that the sealing lip of the elastomer layer 458 is very true to shape and contains no voids as this prevents blind seams within the elastomer layer 458 and shape defects, which can be found with multiple runners.

The invention claimed is:

1. A method for producing a steering gear housing, comprising:
   providing a first housing in which a steering gear is housed;
   producing a plastic housing including a base body and at least one closure element, the plastic housing being separate from the first housing and being positioned adjacent the first housing;
   applying an elastomer layer, by way of at least one gate point in a gating process, between the base body and said at least one closure element so as to join the base body and the at least one closure element to each other, wherein the elastomer layer achieves a necessary deformation of the at least one closure element with respect to the base body when fixing the plastic housing to the first housing.

2. The method according to claim 1, wherein the elastomer layer is applied by way of exactly one gate point.

3. The method according to claim 1, wherein the material used for the elastomer layer is a thermoplastic elastomer.

4. The method according to claim 1, wherein the material used for the elastomer layer is a silicone material.

5. The method according to claim 1, wherein an injection molding process is used in said producing the plastic housing.

6. The method according to claim 1, wherein said applying the elastomer layer comprises a sprue gating step.

7. The method according to claim 1, wherein said applying the elastomer layer comprises a diaphragm gating step.

8. The method according to claim 1, wherein the produced plastic housing is connected to the first housing to form the steering gear housing.

9. The method according to claim 1, wherein said elastomer layer is configured to adapt to a deforming of the at least one closure element, when fixing the plastic housing to the steering housing, to maintain contact with the base body at the elastomer between the base body and the at least one closure element.

10. The method of claim 1,
    wherein said at least one closure element is configured to deform with respect to said base body during an installation of the plastic housing to the first housing for fixing the plastic housing to the first housing; and
    further comprising said elastomer layer conforming to the deforming of the at least one closure element, when fixing the plastic housing to the steering housing, to maintain a contact with the base body at the elastomer between the base body and the at least one closure element.

11. The method according to claim 1, wherein said applying the elastomer layer comprises applying the elastomer layer continuously across an entire circumference of the base body.

12. The method according to claim 1, further comprising securing the base body to the first housing, wherein said first housing has a groove and wherein said at least one closure element is configured to engage said groove so as to secure the base body in place to the first housing to close an opening of the first housing, said at least one closure element being stressed into engagement with said groove by axial compression of the elastomer layer.

13. The method according to claim 1, further comprising securing the base body to the first housing, wherein said first housing has a groove and wherein said at least one closure element is configured to engage into a snap fit connection with said groove so as to secure the base body in place to the first housing to close an opening of the first housing.

* * * * *